United States Patent
Underbrink et al.

(10) Patent No.: US 7,546,423 B2
(45) Date of Patent: Jun. 9, 2009

(54) SIGNAL PROCESSING SYSTEM CONTROL METHOD AND APPARATUS

(75) Inventors: Paul A. Underbrink, Lake Forrest, CA (US); Henry Falk, Long Beach, CA (US)

(73) Assignee: SiRF Technology, Inc., San Jose, CA (US)

( * ) Notice: Subject to any disclaimer, the term of this patent is extended or adjusted under 35 U.S.C. 154(b) by 33 days.

(21) Appl. No.: 10/874,637

(22) Filed: Jun. 22, 2004

(65) Prior Publication Data

US 2005/0060512 A1     Mar. 17, 2005

Related U.S. Application Data

(63) Continuation-in-part of application No. 10/762,852, filed on Jan. 22, 2004.

(60) Provisional application No. 60/499,961, filed on Sep. 2, 2003, provisional application No. 60/547,384, filed on Feb. 23, 2004, provisional application No. 60/546,816, filed on Feb. 23, 2004.

(51) Int. Cl.
*G06F 13/16* (2006.01)
*H04B 1/00* (2006.01)
*H04B 7/00* (2006.01)

(52) U.S. Cl. ............... 711/147; 375/130; 455/12.1
(58) Field of Classification Search ............... None
See application file for complete search history.

(56) References Cited

U.S. PATENT DOCUMENTS

| | | | | |
|---|---|---|---|---|
| 6,041,379 A * | 3/2000 | Sher | ............... | 710/316 |
| 6,778,135 B2 * | 8/2004 | Warloe et al. | ............... | 342/357.12 |
| 2003/0046492 A1 | 3/2003 | Gschwind et al. | | |
| 2003/0088741 A1 * | 5/2003 | Peng et al. | ............... | 711/146 |
| 2003/0147457 A1 | 8/2003 | King et al. | | |

* cited by examiner

*Primary Examiner*—Hyung S Sough
*Assistant Examiner*—Shawn Eland
(74) *Attorney, Agent, or Firm*—The Eclipse Group LLP

(57) ABSTRACT

A signal processing system control method and apparatus are described. Various embodiments include a signal processing system with multiple subsystems. A method for controlling the signal processing system includes storing channel records in a designated area of shared memory. Channel records include channel data that include one of multiple discrete signals to be processed by multiple subsystems in a time-multiplexed manner. The channel record includes information used by the multiple subsystems to process a channel, including information used to configure the multiple subsystems, information used to allocate the shared memory, and information used to communicate between multiple subsystems.

46 Claims, 28 Drawing Sheets

HOT START

| HW Controlled | SW Controlled | Enabled for stalls |
|---|---|---|
| HW SS2 on | SW SS2 On | |
| HW SS3 on | SW SS3 On | |
| HW SS2 Active | | |
| HW SS3 Active | | |
| HW set SS2 finished chan | SW clear SS2 finished chan | ss2 wait |
| HW set SS3 finished chan | SW clear SS3 finished chan | ss2 wait, ss3 wait |
| HW set SS3 pdi done | SW clear SS3 pdi done | |
| HW FIFO1 overflow | SW clear FIFO1 overflow | |
| HW SS2 coh accum clip | SW clear SS2 coh accum clip | |

FIG. 22

| | Clock | Type | Used | Semaphore | Seq Time | Priority | Note: |
|---|---|---|---|---|---|---|---|
| Timer Interrupts: | | | | | | | Interrupt Controller: |
| -RO_IRQ_pulse_wclk_0 | wclk | | yes | | | L0 | 1) 20 level one interrupts (including input from level 2) |
| -RO_IRQ_pulse_ext1_1 | extclk | | yes | yes | | L1 | -interrupts start at priority 10 2) 19 level two interrupts |
| -RO_IRQ_pise_acq_2 | acqclk | acqclk | | | | L2 | |
| -alarm_pulse_acq | acqclk | | yes | | | 0 | |
| -alarm_pulse_ext1 | extclk | | yes | | | 1 | |
| -alarm_pulse_wclk | wclk | | yes | | | 2 | |
| -sync_IRQ_pulse_wclk_0 | wclk | | yes | | | 14 | |
| -sync_IRQ_pulse_ext1_1 | extclk | | yes | | | 15 | |
| -sync_IRQ_pulse_ext1_2 | extclk | | yes | | | L3 | |
| -sync_IRQ_pulse_acq_3 | acqclk | | yes | | | 16 | |
| -sync_IRQ_pulse_acq_4 | acqclk | | yes | | | L4 | |
| -search_IRQ_pulse_acq | acqclk | | yes | | | L5 | |
| -search_IRQ_pulse_ext1 | extclk | | yes | | | L6 | |
| SS2 Interrupts: | | | | | | | |
| -SS2 channel done | spclk | HW stat | yes | s | Cntxt | 5 | -no semaph, SW clears SS2 pause register |
| -SS2 paused | spclk | HW stat | yes | pause flag | Cntxt | 17 | -(ss2OnSS2^ss2OnSW)causes interrupt, not ss2OnSS3 |
| -channel terminated (ss2On rest) | spclk | HW stat | yes | s | Cntxt | L7 | |
| -FIFO1 overflow | spclk | HW stat | yes | s | Cntxt | 4 | |
| -coherent Saturate | spclk | HW stat | yes | s | Cntxt | 11 | |
| -xcorr calculated | spclk | HW stat | yes | s | Cntxt | L8 | |
| -msec adjusted | spclk | SW cmd | no | s | Cntxt | L9 | |
| -ss2 parameter error | spclk | SW cmd | ??? | | Cntxt | 3 | -not yet def: RAM param err that would corrupt mem |
| | extclk | SW cmd | no | | | | |
| SS3 Interrupts: | | | | | | | |
| -SS3 channel done | spclk | HW stat | yes | s | Cntxt | 6 | -do other HW stat semaphores get updated here |
| -SS3 PDI done | spclk | HW stat | yes | s | PDI | 7 | - no semaph, SW clears SS3 pause register |
| -SS3 paused | spclk | HW stat | yes | pause flag | Cntxt | 18 | -(ss3OnSS3^ss3OnSW)causes interrupt, not ss3OnSS2 |
| -channel terminated(ss3On rest) | spclk | HW stat | yes | s | Cntxt | 19 | |
| -FFT overflow | spclk | HW stat | yes | s | Cntxt | 12 | |
| -NCS overflow | spclk | HW stat | yes | s | Cntxt | 13 | |
| -NCS complete | spclk | HW stat | yes | s | Cntxt | 10 | |
| -xcorr parameter not ready | spclk | HW stat | no | s | Cntxt | L10 | -t1TwidCnt Mismatch against xcorr param table |
| -xCorrASError | spclk | HW stat | no | s | Cntxt | L11 | -mismatch of applied AS against xCorr param table |
| -normASError | spclk | HW stat | ??? | s | Cntxt | L12 | |
| -100mut report | spclk | SW cmd | yes | s | Cntxt | 8 | -interrupt occurs when 100mut report executed |
| -HWTL interrupts? | spclk | HW stat | no | s | Cntxt | 9 | |
| -apply SW HWTL aiding | spclk | SW cmd | ??? | s | Cntxt | L13 | |
| -ss3PhaseAdjust | spclk | SW cmd | ??? | s | Cntxt | L17 | |
| -nesShutOff | spclk | SW cmd | ??? | s | Cntxt | L18 | -SW commanded clean shutdown of SS2 and SS3 |
| Other Interrupts: | | | | | | | |
| -DSP RAM read access violation | spclk | | yes | | | L14 | |
| -DSP RAM write access violation | spclk | | yes | | | L15 | |
| -Viterbi complete | spclk | | yes | | | L16 | |

FIG. 23

-SS2: FIFO1 chan initiation overflow detect
- shut down SS2(ss2OnSS2=0) and SS3 (ss3OnSS2=0)
- set fifo1 Overflw semaphore and interrupt (if enabled)

-SS3: FIFO2 errors - none identified that would cause termination

-SS3: NCS timeout - occurs when ncsCount reaches greater than nesCountMod
- if ncsStopNormalEn=1 then shut down SS2 (ss2OnSS3=0) and SS3 (ss3OnSS3=0)
- set ncsComplete semaphore and interrupt (if enabled)
- bit sync mode: allow all T1 offsets to complete before terminating channel or setting semaphore
- odd/even/mutlFreq:allow all runs to complete before terminating channel or setting semaphore -SS3: NCS overflow prevention or auto scale termination event, very strong signal detect
- ncs overflow occurs if all auto scale bits are used up and another scale would be required on next pass
- auto scale termination event occurs if ncs auto scale adjust detected on current PDI and (nesCount < nesASStop[currentAS])
- stop NCS accumulations
  - if nesStopEarlyEn=1 then:
    1) shut down SS2 (ss2OnSS3=0) and SS3 (ss3OnSS3=0)
    2) set nesComplete semaphore and interrupt (if enabled)
  -otherwise disable ncs accumulation and peak generation for ncs duration and then start up again
-set ncsComplete semaphore and interrupt (if enabled)
-bit sync mode: allow all T1 offsets to complete before terminating channel or setting semaphore
-odd/even/multFreq: allow all runs to complete before terminating channel or setting semaphore -SS3: SW command asynchronous ncsShutOff
- allows SW clean way to turn off channel
- commanded by semaphore
- SS3 complete current context and upon channel shut down it resets ss2OnSS3 and ss3OnSS3
  - this allows cleaning out from shared FIFO2 of any data generated by the channel

FIG. 24

SIGNAL PROCESSING SYSTEM CONTROL METHOD AND APPARATUS

RELATED APPLICATION

This patent application is a continuation-in-part of U.S. patent application Ser. No. 10/762,852, entitled "Dynamic Memory Allocation and Sharing in Electronic Systems," by Paul A. Underbrink and Henry Falk, filed Jan. 22, 2004, which is incorporated by reference herein in its entirety. This application also claims priority from U.S. Provisional Patent Application No. 60/499,961, entitled "GPS System," filed Sep. 2, 2003, U.S. Provisional Patent Application No. 60/547,384, entitled "Signal Processing System for Satellite Positioning Signals," filed Feb. 23, 2004, and U.S. Provisional Patent Application No. 60/546,816, entitled "Control and Features for Satellite Positioning System Receivers," filed Feb. 23, 2004, all of which are incorporated by reference herein in their entireties.

TECHNICAL FIELD

The disclosed embodiments relate to dynamic memory partitioning and sharing in electronic systems.

BACKGROUND

Portable electronic processor-based devices with diverse capabilities have become very popular around the world. As the popularity of portable electronic devices has increased, so too has consumer dependence on these devices. Consumers now rely on portable electronic devices, such as personal computers, personal digital assistants (PDAs), cellular telephones, and satellite-based positioning system devices, for everything from remote Internet access to communication. Increasingly, consumers demand varied data and voice capabilities in one relatively small device. Manufacturers have responded by producing handheld devices with multiple data, voice and satellite-based positioning capabilities.

An example of a device that performs several functions or applications is a cellular phone that can send and receive email, send and receive text messages, and locate itself using satellite-based positioning technology. Personal digital assistants (PDAs) also provide increasingly varied applications to users. Each application requires processing power and memory, some of which may be resident on the device, and some of which may be remotely hosted. Various manufacturers typically produce components and software to perform specific functions on a device. These various components and associated software for various functions are typically inserted in a larger system and must communicate and cooperate so as to efficiently use available resources on the device, including processor cycles and memory.

Even though semiconductor manufacturing technology has progressed to produce greater capability in ever smaller packages, there is always a demand for more processing power and memory, especially on small devices. For example, if memory is not used efficiently, it may be necessary to provide more physical memory, which increases both the size and the cost of the device. It is therefore desirable for the specifically designed hardware and software to be configurable so as to flexibly allocate scarce resources, such as memory, when inserted in the larger system of the device. Memory is a particularly important resource in systems that process large amounts of data, such as signal processing intensive systems. An example of a signal processing system whose performance is typically in direct proportion to the amount of memory available is a satellite-based positioning system. Commonly, the speed and efficiency of the satellite-based positioning system is limited by the amount of memory it is able to use. It is therefore desirable to have efficient memory usage in systems, such as signal processing systems, that are to be integrated into larger systems.

BRIEF DESCRIPTION OF THE DRAWINGS

Embodiments of the invention are described with the aid of the drawings, which are not intended to be limiting. In the drawings, similar reference numbers identify similar elements or acts.

FIG. 22 is a list of the SS2, SS3, and FIFO1 semaphores, including HW controlled semaphores, SW controlled semaphores and "pause" semaphores in one embodiment.

FIG. 23 is a list of interrupts according to an embodiment.

FIG. 24 is a list of termination conditions for SS2 and SS3 according to an embodiment.

BRIEF SUMMARY OF THE INVENTION

Figure 1:
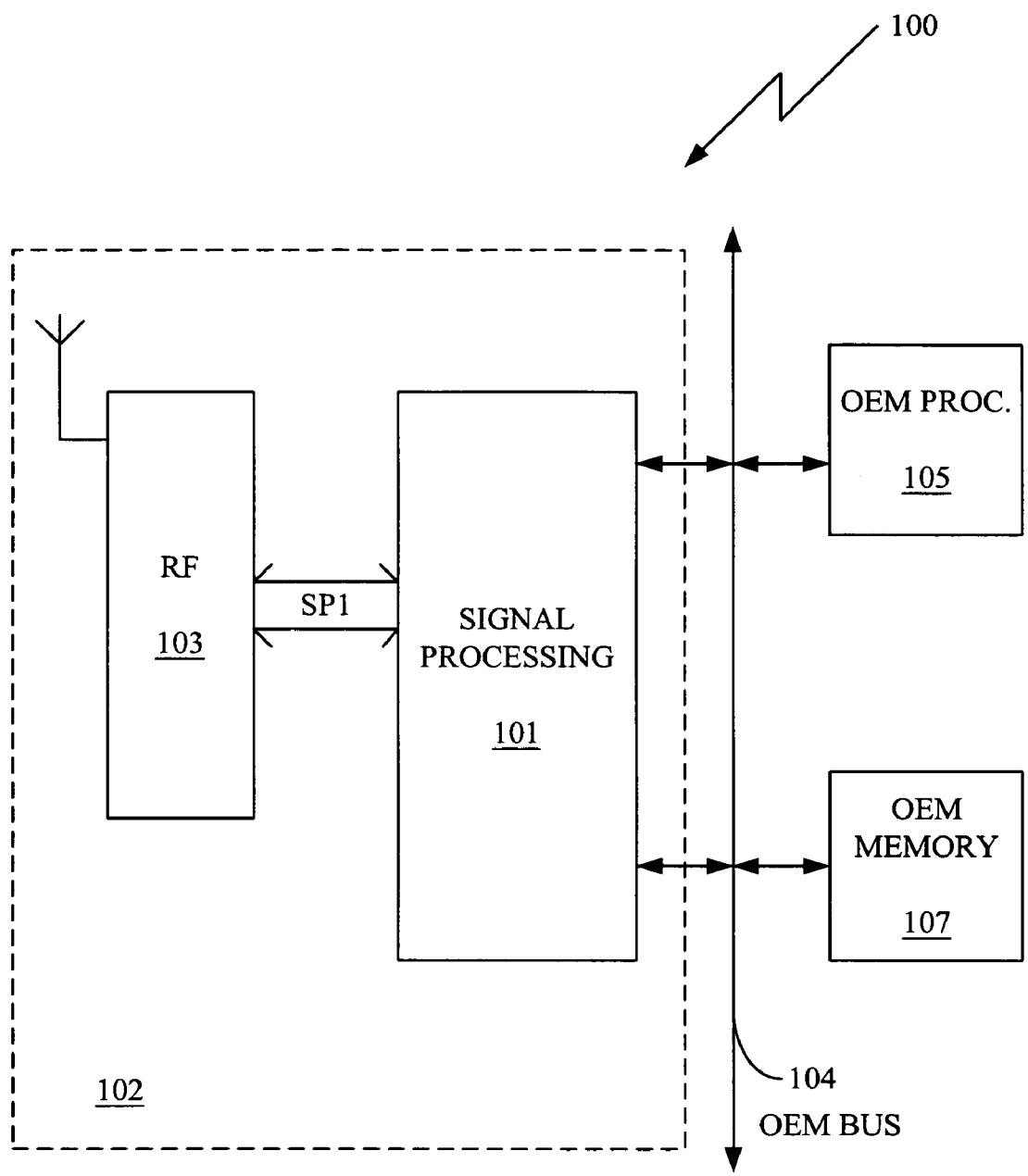
FIG. 1 is a block diagram of an embodiment of a system including a signal processing system.

Not Applicable.

DETAILED DESCRIPTION

A system and method for dynamic memory allocation and sharing are described. Embodiments include allocating random access memory (RAM) to various regions that have varying sizes, are accessed by particular subsystems, and store particular types of data. The RAM allocation varies with operational modes of a data processing system, such as a signal processing system. Once the available memory is allocated, the different regions are shared by different subsystems which may be operating in different modes concurrently.

Various embodiments are illustrated in a signal processing system, in particular a global positioning system (GPS). The embodiments are not limited to such a system, and are useful in any electronic system in which memory is a limited resource that must be allocated and reallocated on an ongoing basis to multiple subsystems. Illustrative examples of embodiments include a signal processing core that processes radio frequency (RF) signals received from satellite vehicles (SVs) in separate channels. The signal processing core operates in several different modes depending on multiple factors, such as how much information the GPS system initially has regarding visible satellites. Available memory is advantageously allocated for most efficient use in a particular operational mode. In addition, available memory is advantageously allocated on a channel-by-channel basis. The term channel is used to indicate a particular usage of hardware resources. A channel can correspond to one or more received signals from one or more particular satellites. Different channels are allocated available memory for use in different modes concurrently. The word channel as used herein can also indicate any discrete signal or data stream that provides a discrete signal to be processed by a signal processing system.

The embodiments described include methods for multichannel signal processing, including continuously receiving multiple channels, processing the multiple channels in a signal processing component on a time-multiplexed basis, and configuring the signal processing component for one of a plurality of operational modes, including allocating a memory into areas for storage of types of data. Certain memory areas are accessed by certain signal processing subsystems in certain manners, and the signal processing component is configured to operate in different modes concurrently for different channels. The signal processing component is continuously reconfigured based on evaluation of output of the signal processing component. The memory is further allocated to include a channel region in which data words are stored by software. The software is executed by a controlling processor. The controlling processor and the software can reside anywhere. The data words include all of the information necessary to configure the signal processing subsystem, including the memory. The data words are read by various subsystems and are also updated by various subsystems, for example by storing address pointers that indicate where a particular subsystem has accessed a memory region, and by storing status information.

In the following description, numerous specific details are introduced to provide a thorough understanding of, and enabling description for, embodiments of the memory allocation and sharing. One skilled in the relevant art, however, will recognize that the dynamic memory allocation and sharing can be practiced without one or more of the specific details, or with other components, systems, etc. For example, instances of particular memory sizes are given for illustration, but other sizes are possible using the same principles described. In addition, various structures and functions are shown in particular arrangements, but are not intended to be limiting. For example, memory structures may reside on one chip or be distributed in any fashion, to include some memory being remotely accessed. In other instances, well-known structures or operations are not shown, or are not described in detail, to avoid obscuring aspects of the dynamic memory allocation and sharing.

FIG. 1 is a block diagram of an embodiment of a system 100, including a signal processing system 102. The signal processing system 102 includes radio frequency ("RF") components and digital signal processing components. An RF component 103 receives RF signals, in one embodiment from GPS satellites, or satellite vehicles (SVs). The RF signals are digitized and transmitted to a digital signal processing component 101. In one embodiment, the RF component 103 and the digital signal processing component 101 communicate via a serial peripheral interface (SPI). The digital signal processing component 101 processes the RF signals, as will be described further below, and transmits processed data to an off-board OEM processor 105 via an OEM bus 104. The digital signal processing component 101 also communicates with an OEM memory 107. As described further below, the digital signal processing component 101 includes memory for signal processing functions. Embodiments of the invention are particularly advantageous in systems that have a limited amount of memory, including memory on the digital signal processing component 101 and the OEM memory 107. Typically, memory is limited in systems, but this is particularly true of systems in handheld or mobile devices.

Optionally, the OEM memory 107 is not required to be accessed by the digital signal processing component 101. Other possible arrangements include all of the RF component 103 functionality and the digital signal processing component 101 functionality located on one component, or chip, including all of the required memory and processing power to perform signal processing functions. The system 100 is capable of operating effectively without GPS aiding information, or alternatively, it may operate with GPS aiding information from a variety of sources.

Figure 2:
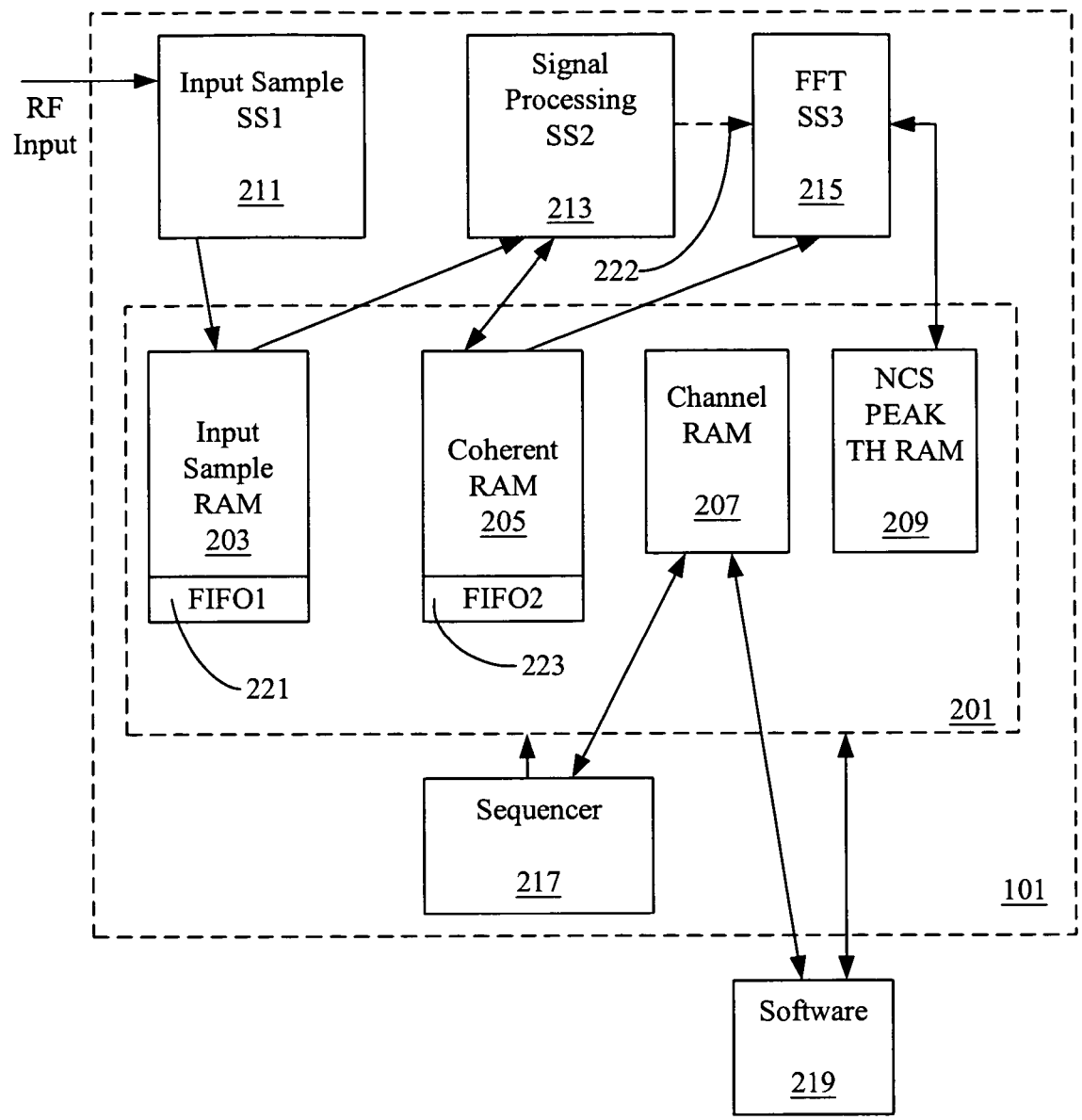
FIG. 2 is a block diagram showing subsystems of one embodiment of a signal processing component.

FIG. 2 is a block diagram showing subsystems of one embodiment of a digital signal processing component 101, including an input sample subsystem (SS1) 211, a signal processing subsystem (SS2) 213, and a fast fourier transform (FFT) subsystem (SS3) 215. The digital signal processing component 101 further includes a memory subsystem 201, which in one embodiment includes random access memory (RAM) that is dynamically allocated and shared between various subsystems as described further below. The memory subsystem 201 can be a single memory component or device, or multiple memory components. The memory subsystem 201 includes an input sample RAM 203, a coherent data RAM 205, a backend storage RAM 209 and a channel RAM 207. The memory subsystem 201 is dynamically allocated such that the input sample RAM 203, the coherent RAM 205, the channel RAM 207, and the backend storage RAM 209 each have varying sizes in various operational modes. In addition, the input sample RAM 203, the coherent RAM 205, and the backend storage RAM 209 are each accessed by different channels in different modes, and shared among different subsystems concurrently.

Input sample RAM 203 is controlled by a control structure 221 called FIFO1 control structure, or FIFO1 221. Coherent RAM 205 is similarly controlled by a control structure 223 called FIFO2 control structure, or FIFO2 223. As explained further below, the FIFO1 221 controls access to the input sample RAM 203, and the FIFO2 223 controls access to the coherent RAM 205. The term FIFO, as used herein, implies the first-in-first-out nature of access to the input sample RAM 203 and the coherent RAM 205 in an embodiment. In other embodiments, the control structure and access to the input sample RAM can have any other character, including for example, last-in-first-out. In FIG. 2, the FIFO1 221 is shown collocated with the input sample RAM 203, and the FIFO2 223 is shown collocated with the coherent RAM 205. Typically, the FIFO1 221 and the FIFO2 223 are not collocated with their respective RAM areas, but are shown as such for illustration in FIG. 2.

The digital signal processing component 101 further includes a sequencer 217, which controls the sequencing of signal processing operations in the digital signal processing component 101. The sequencer 217 is shown as a separate component, but can be collocated with other components. For example, in embodiments described below, the sequencer 217 functionality resides partially on the signal processing subsystem 213 and partially on the FFT subsystem 215. A software component 219, hereinafter referred to as SW 219, controls the sequencer 217, and therefore the signal processing operations in the digital signal processing component 101, by storing words in the channel RAM 207. In one embodiment, the SW 219 is resident on the off-board OEM processor 105 and/or the OEM memory 107, but this is not a requirement. As further described below, the OEM processor 105 controls the signal processing component in a distributed processing manner using the SW 219, which continually receives data and status information from the signal processing component 101. The data and status information is used to continually reconfigure the signal processing component 101 through messaging described in more detail below. It is advantageous in many embodiments to have the signal processing component 101 controlled by an off-board processor, as shown here. For example, this allows the processing capability of the signal processing component 101 to be relatively small. However, the processing capability and functionality represented by the SW 219 (shown here as an off-board capability) could also reside anywhere on the signal processing component 101.

The digital signal processing component 101 receives digitized RF data samples from the RF component 103. The data samples are samples of data streams from SVs, each of which transmits a unique pseudorandom noise (PRN) code in a known manner. Broadly speaking, the digital signal processing component 101 processes the data samples to determine which satellite transmitted them, and also to extract information, such as ephemeris and almanac information, from the samples. As is known in the art, when the absolute location of four SVs, and their relative distances from a receiver, are known by the receiver, the location of the receiver can be known. The digital signal processing component 101 processes data samples in one of four modes depending on how much current location information is known.

The input sample subsystem 211 receives the input RF data samples at a rate determined by the sender. Under the control of the FIFO1, the input sample subsystem 211 stores the data samples in the input sample RAM 203 in a manner that is dependent on the operational mode of the digital signal processing component 101. The size of the input sample RAM 203 is also determined by the operational mode of the digital signal processing component 101. Under the control of the FIFO1, the signal processing subsystem 213 takes RF input samples from the RAM 203 to operate on. The operations performed on the RF signal samples can vary depending on the signal processing mode. For example, the signal processing subsystem 213 may or may not perform a decimation operation on the signal samples. The signal processing subsystem 213, using a matched filter in one embodiment, coherently accumulates data samples in the coherent RAM 205. Coherent accumulation is effectively accumulating I (in phase) and Q (quadrature) data for a specified period. The coherently accumulated data samples are taken from the coherent RAM 205 by the FFT subsystem 215 for FFT processing. The size of the coherent RAM 205 is also determined by the operational mode of the digital signal processing component 101.

In one situation, little or no information is known about the location of the receiver. In this situation, there is little or no information regarding which SVs are visible to the receiver, and the available time information is inaccurate. In this situation, the digital signal processing component 101 processes data samples in a "cold start" mode. In the cold start mode, as much data is processed as quickly as possible with a low degree of sensitivity, or resolution. This is because the search space for the SV signals is very large; there is no current data to focus the initial acquisition phase. In cold start mode, no coherent accumulation occurs, and data samples are sent straight to the FFT subsystem 215 from the signal processing subsystem 213 via a path 222.

In modes other than cold start mode, the FFT subsystem 215 takes a certain number of data samples out of the coherent RAM and performs FFT operations on them. In cold start mode, the FFT subsystem 215 operates on the coherent data samples straight from the SS2 213. The SS3 215 generates a number of frequencies as dictated by the particular processing mode. As an example, for an 8 sample, 16 point FFT, the FFT generates 16 frequencies. Not all of the 16 frequencies may be of interest. For example, the outer frequencies may not be useful. The number of frequencies is programmable. Desired frequencies are selected, packed in a more compact form, and stored in a noncoherent summation (NCS) region of the backend storage RAM 209, which accumulates noncoherent data, that is, the magnitudes derived from the I and Q data. As further described below, the backend storage RAM 209 is also used for storing peak values, or peaks. In one embodiment, the eight largest values are stored, as well as information regarding where they occurred in the data stream, e.g., at what code offset and at what frequency offset. The track history (TH) information is selected coherent data that is stored for examination by the SW 219. In one embodiment, the TH information is the output of a gather module (not shown). The gather module selects among the frequency outputs of the FFT subsystem 215, discarding unwanted frequencies. The gather module maintains data in a coherent form. The SW 219 can make decisions regarding the configuration of the signal processing component 101 by examining the TH information. The size of the backend storage RAM 209 is also determined by the operational mode of the signal processing component 101.

Various terms are used herein to describe processing epochs, including T1, PDI, and context. A T1 is a time period, in milliseconds, specified for coherent accumulation in the coherent accumulator for a channel. The length of a T1 is programmable and varies with the operational mode. For example, in some modes, it is desirable to accumulate for a longer period to look for a weaker signal. The signal processing subsystem 213 thus coherently accumulates on a T1 basis.

A PDI is a programmable number of T1s. The number of T1s that is fed into the FFT subsystem 215 at one time constitute a PDI. The number of T1s in a PDI is determined by how the FFT subsystem 215 is configured to process data in a particular mode. As stated above, the signal processing subsystem 213 coherently accumulates on a T1 basis. However, the FFT subsystem 215 operates on data on a PDI basis. Therefore, the FFT subsystem 215 only pulls data from the coherent RAM 205 when a complete PDI is available. For example, if the FFT subsystem 215 is configured as a 5-sample, 16 point, zero-padded FFT, the FFT subsystem 215 waits for 5 samples or 5 T1s to be complete and stored in the coherent RAM 205 before it begins pulling data out of the coherent RAM 205.

The use of the various subsystems is time-multiplexed between different channels. Context is a term used herein to denote the use of a particular subsystem for processing a particular channel. For example, for a particular channel, a context begins when the channel enters the signal processing subsystem 213, and the context ends when that channel leaves the signal processing subsystem 213. This implies that the signal processing subsystem 213 will run for a programmed number of milliseconds, consuming data from the input sample RAM 203, and then stop, which ends the context. A channel has a similar context with respect to the FFT subsystem 215.

As stated above, the SW 219 stores words in the channel RAM 207 that control the operation of the signal processing component 101. The stored words make up channel records. In one embodiment, the channel records are each 128 lines containing various types of data, but basically containing all of the channel specific data that the signal processing component is to use. The channel record includes programming information from the SW 219, load type information, size parameters, the size allocations for the input sample RAM 203, the coherent RAM 205, the backend storage RAM 209, and other areas of the RAM 201 for that particular channel. It includes code phase, carrier phase, carrier frequency, acceleration, and all other processing parameters for a single channel. The use of the signal processing subsystem 213 and the FFT subsystem 215 is time multiplexed between different channels, so each channel must save its state.

The channel RAM 207 is initialized by the SW 219, but it is then updated by the signal processing subsystem 213, the FFT subsystem 215, and occasionally by the SW 219. For example there is a semaphore word in the channel RAM 207 that is used for communication between the signal processing subsystem 213, the FFT subsystem 215, and the SW 219. The semaphore word is a mechanism for synchronizing communication between the signal processing subsystem 213, the FFT subsystem 215, and the SW 219, which operate in a semi-asynchronous manner.

The channel records are essentially linked lists that include pointers to locations in the various RAMs, including the input sample RAM 203, the coherent RAM 205, and the backend storage RAM 209. The channel records thus store the configuration of the dynamically allocated RAM 201 for a context. The first channel record entry is a pointer to the next channel record. When a context begins, the channel RAM is accessed to determine an operating mode and the RAM allocation for the context. When the context is about to complete, updated channel information is stored in the channel record and the processing continues with the contents of the next channel record that is pointed to by the entry in the current channel record. The channel record also includes current counts and states, code phase information, and time alignments relative to the input data samples.

When a channel is initiated, a sequencer 313a (shown in FIG. 3 and described below) of the signal processing subsystem 213 accesses the channel RAM 207 and pulls in channel parameters required for the signal processing subsystem 213 to process that particular channel. The sequencer 313a also programs various signal processing elements (not shown) of the signal processing subsystem 213, such as a matched filter, and a coherent accumulator, with parameters as needed to process that channel. The parameters, for example, determine the number of milliseconds for which the matched filter is to perform processing. When the matched filter is finished processing, the matched filter signals the sequencer 313a that it is finished, and the sequencer 313a moves on to the next channel.

The channel RAM 207 includes a linked list that stores the location of the channel RAM for the next channel, and so on.

The FFT subsystem 215 also includes a sequencer 315a (shown in FIG. 3 and described below) that accesses the channel RAM to determine how to process data. The FIFO2 223 controls access to the coherent RAM 205 for both the FFT subsystem 215 and the signal processing subsystem 213. For example, the FIFO2 223 lets the FFT subsystem 215 know when there is data to operate on in the coherent RAM 205. The FIFO2 223 also lets the signal processing subsystem 213 know when it is about to overwrite data that the FFT subsystem 215 has not used yet.

Figure 3:
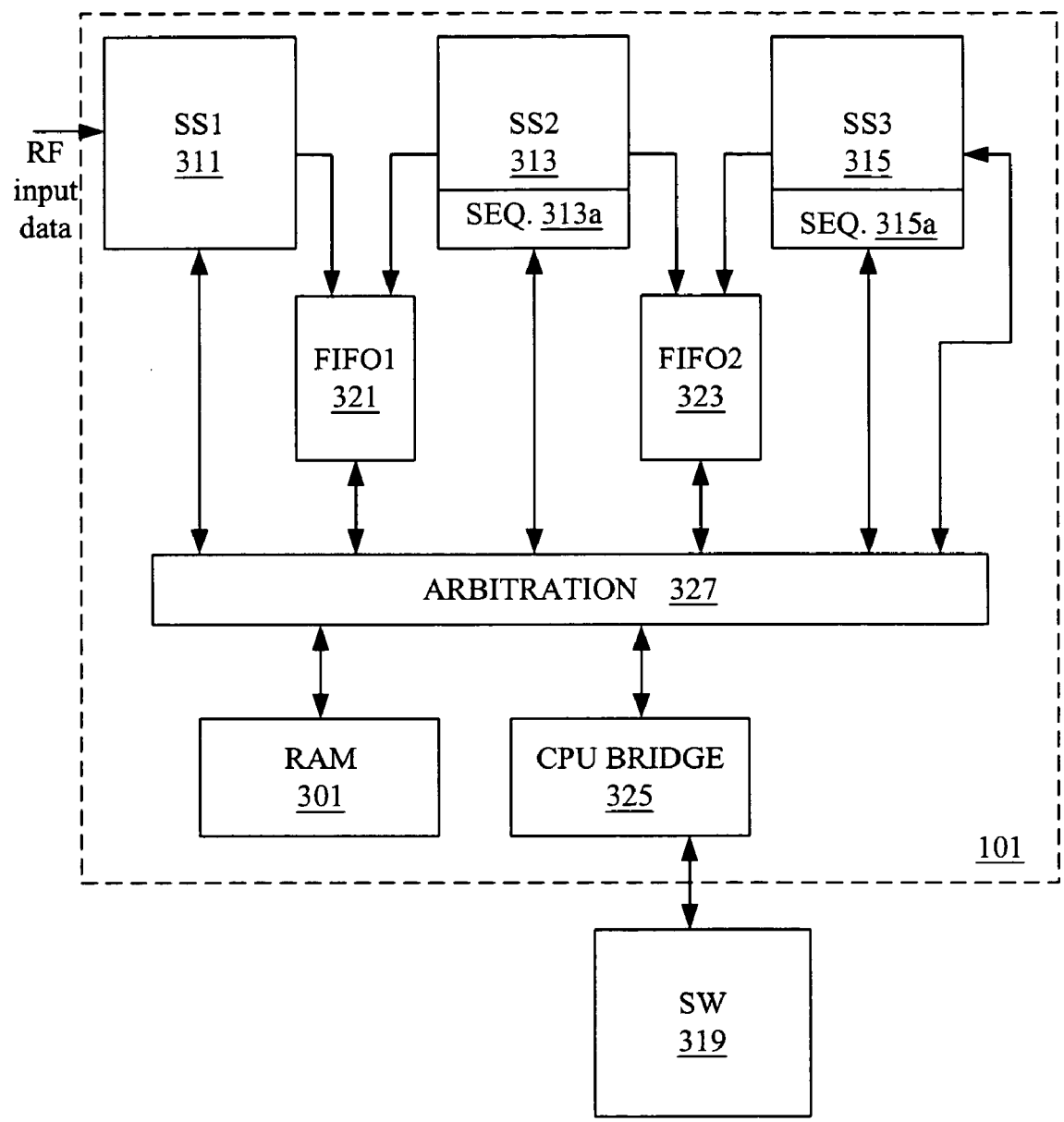
FIG. 3 is block diagram of an embodiment of the signal processing component, including an arbitration unit.

FIG. 3 is block diagram of an embodiment of the signal processing component 101 showing additional elements, including an arbitration unit 327. An input sample subsystem 311 and a signal processing system 313 access a memory subsystem, or RAM 301, under control of a FIFO1 321. In one embodiment, the sequencer functionality for the signal processing subsystem 313 is collocated with the signal processing subsystem 313 in an SS2 sequencer 313a. One function of the sequencer 313a is to access a channel RAM area of the RAM 301 to read out channel parameters and to write updated channel parameters back to the channel RAM area of the RAM 301.

The signal processing subsystem 313 and the FFT subsystem 315 access the RAM 301 under control of a FIFO2 323. In one embodiment, the sequencer functionality for the FFT subsystem 315 is collocated with the FFT subsystem 315 in an SS3 sequencer 315a. The FIFO1 321, the SS2 sequencer 313a, the FIFO2 323, and the SS3 sequencer 315a communicate with the arbitration unit 327 for access to the RAM 301.

The arbitration unit 327 further communicates with a SW element 319 through a central processing unit (CPU) bridge 325 for access by the SW 319 to the RAM 301.

The input sample subsystem 311 sends requests for access to RAM 301 through the FIFO1 321 and receives grant signals from the arbitration unit 327. After a grant signal is received by the input sample subsystem 311, it sends an address to the FIFO1 321 indicating where it is storing input sample data, and the input sample subsystem stores the input sample data in the RAM 301.

When the signal processing subsystem 313 seeks to process input data samples, it sends a request for access to the input sample area of the RAM 301 through the FIFO1 321 and receives a grant signal from the arbitration unit 327. After a grant signal is received by the signal processing subsystem 313, it receives data samples from the RAM 301. When the signal processing subsystem 313 seeks to store processed coherent data in the coherent RAM area of the RAM 301, it sends a request signal through the FIFO2 323 to the arbitration unit 327. From the channel record, the sequencer 313a determines the appropriate address(es) at which to store the coherent data. The signal processing subsystem 313 receives a grant signal from the arbitration unit 327, and the storage addresses are sent by the signal processing system to the RAM 301, as is the coherent data to be stored.

When the FFT subsystem 315 seeks to process coherent data, it sends a request for access to the coherent data area of the RAM 301 through the FIFO2 323 to the arbitration unit 327. When the request is granted, the address, which again is known from the channel record, is sent to the coherent data area of the RAM 301 and the coherent data is read out to the FFT subsystem 315.

The SW 319 requests access to the RAM 310 through the arbitration unit 327 to write records in the channel RAM area which dictate the operation of the signal processing component 101. The SW 319 further requests access to the RAM 310 through the arbitration unit 327 to read data, such as TH data, report data, and error data that indicate a status of the subsystems and provide a basis for ongoing programming of the signal processing component 101 through the channel records in the channel RAM.

Figure 4:
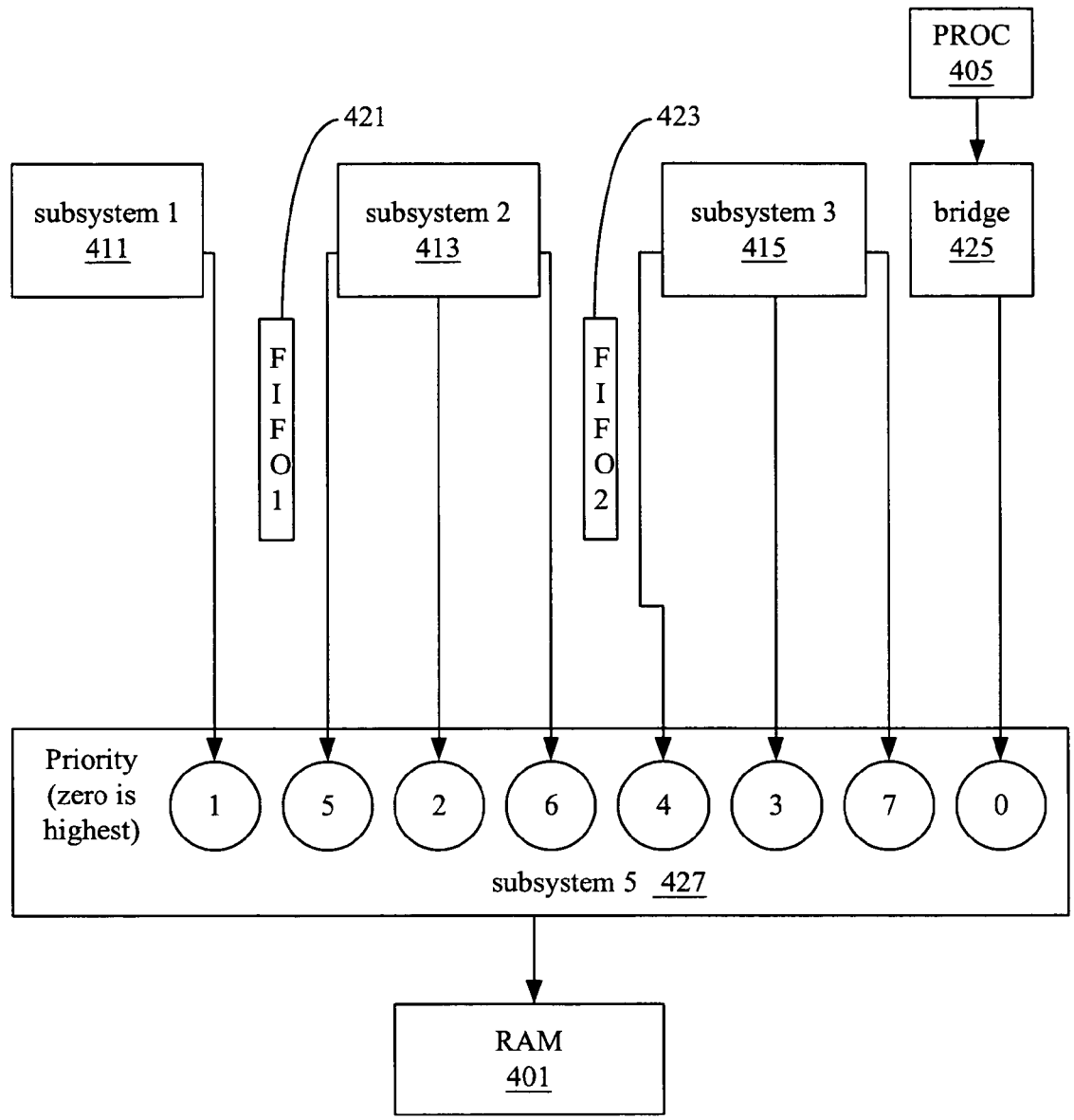
FIG. 4 is a block diagram showing an arbitration unit and illustrating an embodiment in which priorities as assigned to different entities to access a RAM.

FIG. 4 is a block diagram showing an arbitration unit 427 and illustrating priority assignments to different entities to access a RAM 401 in an embodiment. The OEM processor 405, which accesses the RAM 401 through the CPU bridge 425 has the highest priority, or priority 0. The priorities are arbitrarily designated such that a lower number indicates a higher priority, but any other designation is possible. An input sample subsystem 411 has a next highest priority of 1. Because the input sample subsystem 411 receives a stream of RF data at a rate that is not under its control, the input sample subsystem 411 has less ability than other subsystems to control its own processing rate, and therefore it is assigned a high priority for access to the RAM 401.

A signal processing subsystem 413 is assigned a priority of 2 for access requests from its sequencer, a priority of 5 for access requests through a FIFO1 421 for reading input data samples from the input sample area of the RAM 401, and a priority of 6 for access requests through the FIFO2 423 for writing coherent data to the coherent data area of the RAM 401.

An FFT subsystem 415 is assigned a priority of 3 for access requests from its sequencer, a priority of 4 for access requests through the FIFO2 423 for reading coherent data from the coherent data area of the RAM 401, and a priority of 7 for writing NCS, TH, and report data to the NCS area of the RAM 401.

Figure 5:
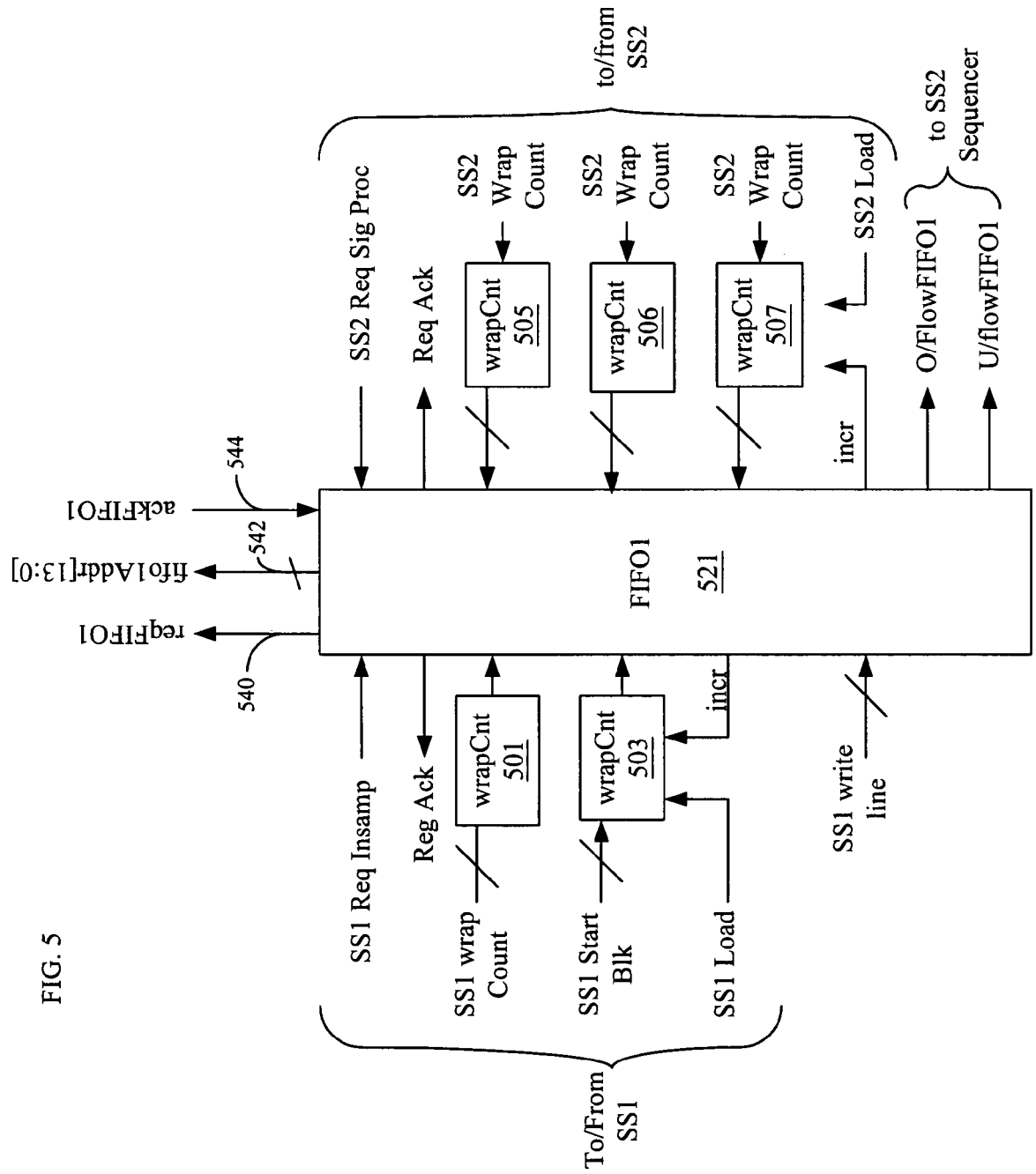
FIG. 5 is a block diagram of a control structure (FIFO1) showing some of the signaling that takes place in controlling access to an input sample RAM.

FIG. 5 is a block diagram of a FIFO1 521 showing some of the signaling that takes place in controlling access to the input sample RAM 203. With reference to the left side of FIG. 5, and also with reference to FIG. 2, the input sample subsystem 211 requests access to the input sample RAM area 203 of the RAM 201 to store input data samples. The signal processing subsystem 213 requests access to the input sample RAM area 203 of the RAM 201 to read out input data samples.

The input sample subsystem 211 sends an SS1 Req Insamp signal to the FIFO1 521 to request to write input data samples. The FIFO1 521 acknowledges receipt of the request with a Req Ack signal. The input sample subsystem 211 sends a wrap count 501 and a start block number 503 to the FIFO1 521. In a circular buffer mode, which is applicable in operational modes of the signal processing component, except for the cold start mode, the input sample RAM 203 is written until it is filled, and then overwritten. In one embodiment, the input sample RAM 203 is filled from the bottom to the top. When the input sample RAM 203 is full, overwriting begins at the bottom. The wrap count 501 increments each time the input sample RAM 203 is filled and begins to be overwritten. The start block number 503 indicates the start of a block of input data samples. The start block number 503 is modified by a load signal, SS1 Load, from the input sample subsystem 211. The Load signal initiates a write operation. When a block has been written, the FIFO1 increments the block count 503 with an Incr signal. The Write Line, from the input sample subsystem 211, is a 7-bit line within a block, which is written to the FIFO1 during writes to the FIFO1.

With reference to the right side of FIG. 5, and also with reference to FIG. 2, the signal processing subsystem 213 requests access to data samples in the input sample RAM 203 with a SS2 Req Sig Proc signal. The FIFO1 521 acknowledges the request with a Req Ack signal. The signal processing subsystem 213 sends a wrap count 505, a start block count 506, and a line number 507 to the FIFO1 521.

In a circular buffer mode, which is applicable in operational modes of the signal processing component, except for the cold start mode, the input sample RAM 203 is written until it is filled, and then overwritten. The wrap count 505 increments each time the input sample RAM 203 is filled and begins to be overwritten. The start block number 506 indicates the start of a block of input data samples. The start block number 506 is modified by a load signal, SS2 Load, from the signal processing subsystem 213. The SS2 Load signal initiates a read operation.

The FIFO1 521 also sends an overflow and an underflow signal to the sequencer 217. Underflow occurs when the signal processing subsystem 213 is attempting to read out data from a location that has not been written yet. When underflow occurs, the signal processing subsystem 213 must wait, or pause. Overflow occurs, in the case of a cyclic write mode, when the top of the input sample RAM 203 is reached and the write pointer goes back to the bottom to begin overwriting, yet the signal processing subsystem 213 has not read out the data about to be overwritten, or already overwritten. Because of the streaming nature of the data received by the input sample subsystem 211, an overflow condition can be detected, but not prevented. In one embodiment, when an overflow occurs in the middle of processing for a channel, "garbage", or invalid data is processed until "good" data is available again. If a channel is being initialized and an overflow occurs, an error signal is sent to the SW 219, the channel is shut down, and the SW 219 decides how to proceed.

Referring to the top of the FIFO1 521, the FIFO1 communicates with the RAM 201 using a request signal 540, an address signal 542, and an acknowledge signal 544.

FIGS. 6, 7, 8 and 9 are block diagrams illustrating configurations of the signal processing component 101, including memory allocations, for various operational modes for an embodiment. The operational modes illustrated include a cold start mode, a coarse acquisition mode, a hot start mode, and a tracking mode.

The cold start mode is applicable when little or no information is available to the signal processing component 101 regarding its own location. For example, if the signal processing component 101 were installed in a handheld device that was carried far away from the location at which it last acquired GPS satellites, it would not know which satellites are visible. Therefore a very broad, low sensitivity search for satellites is performed, necessitating the processing of a large quantity of data.

The coarse acquisition mode is appropriate when some information is known about the location of the signal processing component 101. Typically, the identity of at least some of the visible satellites is known.

The hot start mode is appropriate when the signal processing component 101 has some very good information about its location. For example, the signal processing component may have navigated within the last day, establishing its location to within about a 100 mi radius. Or possibly, an external source supplied the ephemeris data and satellite time.

The track mode is appropriate when the signal processing component 101 has excellent information about its position, and is tracking satellites it has already acquired. In the track mode, it is possible to turn off more of the signal processing component 101 functionality, thus consuming less power.

Figure 6:
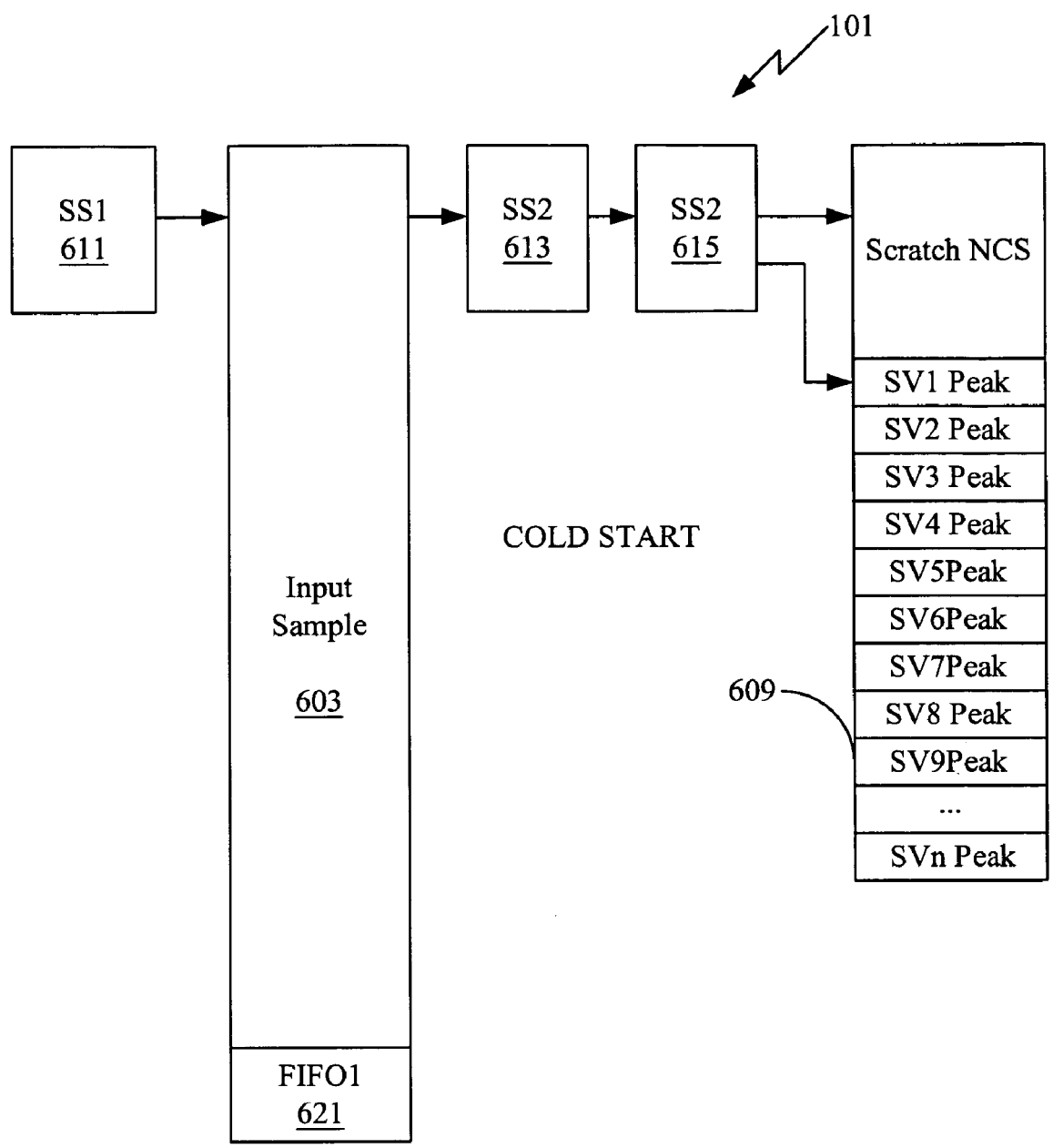
FIG. 6 is a block diagram illustrating a configuration of the signal processing component, including memory allocations, for a cold start mode.

Referring to FIG. 6, a configuration of the signal processing component 101, including memory allocation, in the cold start mode is illustrated. In the cold start mode, there is no coherent RAM area. The available RAM area includes a relatively large input sample buffer 603 that is used as snapshot, or one-shot input sample RAM. In one embodiment, the size of the input sample RAM 603 is approximately 100 Kbytes. As stated, the input sample RAM 603 is used in a one-shot manner. After the input sample RAM 603 is filled, the RF input is no longer received, and the various subsystems operate on the data in the input sample RAM 603 multiple times, as described below. This makes it possible to turn off the RF receiver after the input sample RAM 603 is filled, which reduces power consumption.

The input sample subsystem 611 writes input data samples into the input sample RAM 603 under control of the FIFO1 621. The signal processing subsystem 613 reads input data samples out of the input sample RAM 603 under control of the FIFO1 621. The signal processing subsystem 613 processes the input data samples and transmits them as coherent data directly to the FFT subsystem 615.

For a particular possible satellite, which we will call SV 1, the data stored in the input sample RAM 603 is reprocessed, or replayed, for every possible frequency SV 1 might have, as well as the entire possible oscillator range and Doppler range. The input sample data in the input sample RAM 603 can be replayed as many as twenty times for each satellite. The data is then passed to a backend storage RAM 609, which stores noncoherent summation data. The backend storage RAM 609 includes an NCS data "scratch" region, and a peak region. The scratch region stores noncoherent data in a cyclic fashion, and can be shared with channels operating in other modes that are not the cold start mode. The largest eight peaks for each satellite are saved in the peak region. The backend storage RAM 609 in one embodiment includes approximately 8 Kbytes for the scratch NCS area, and approximately 2.4K for the peak region, which stores about 50 peaks. As a channel completes, the SW 219 goes through the peak list, decides which peak might represent a signal and selects only these for verification. The peak space freed up by the rejected peaks is filled with new peaks.

As an example, the configuration of the signal processing component 101 for the cold start mode can include parameters of the following approximate values: a PDI of one millisecond; a frequency coverage per processing run of four KHz; and a sensitivity, or resolution, of 28 dbHz.

Figure 7:
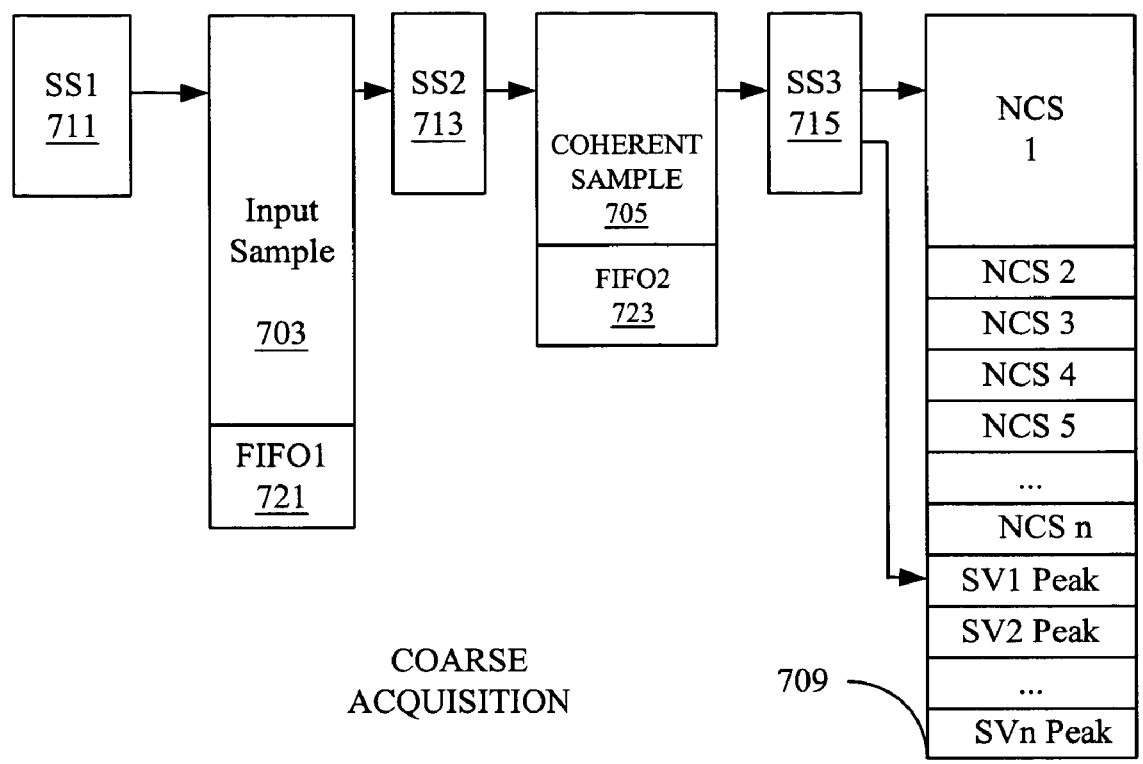
FIG. 7 is a block diagram illustrating a configuration of the signal processing component, including memory allocations, for a coarse acquisition mode.

FIG. 7 is a block diagram of a configuration of the signal processing component 101, including memory allocation, in the coarse acquisition mode. In the coarse acquisition mode, the largest portion of the memory is allocated for a backend storage RAM 709, and an input sample RAM 703 is relatively small. For example, in one embodiment the input sample RAM 703 is approximately 10K in size. The input sample RAM 703 is used as a short, circular buffer. A coherent sample RAM 705, which stores coherent data samples, is used as a scratch buffer.

The input sample subsystem 711 receives input data samples and stores them in the input sample RAM 703. In the coarse acquisition mode, one or two visible satellites are typically known. Therefore, these known satellites can be searched for concurrently. The signal processing subsystem 713 processes the input sample data and fills a coherent sample RAM 705 with 7 milliseconds of data representing one frequency/satellite combination. The FFT subsystem 715 operates on the coherent data that is stored in the coherent sample RAM 705 and stores the resultant NCS data in the backend storage RAM 709. Peaks associated with the NCS data are also stored in the backend storage RAM 709. In this mode, the backend storage RAM 709 is shared between channels, but is "dedicated NCS" storage in that different regions are dedicated to NCS data from different channels. The NCS 1 data is for channel 1, the NCS 2 data is for channel 2, etc.

In the coarse acquisition mode, as much memory as possible is devoted to the backend storage RAM 709 because performance is improved when the OEM processor has more NCS data to operate on. As an example, the configuration of the signal processing component 101 for the cold start mode can include parameters of the following approximate values: a PDI of seven milliseconds; a frequency coverage per processing run of 750 Hz; and a sensitivity of 20 dbHz. In the coarse acquisition mode, the input sample RAM 703 is larger than PDI, and the coherent RAM 705 is larger than PDI. As used herein, to be larger or smaller than PDI means that the allocated memory space stores more than or less than, respectively, the amount of data that can be processed in the time period of a PDI.

Figure 8:
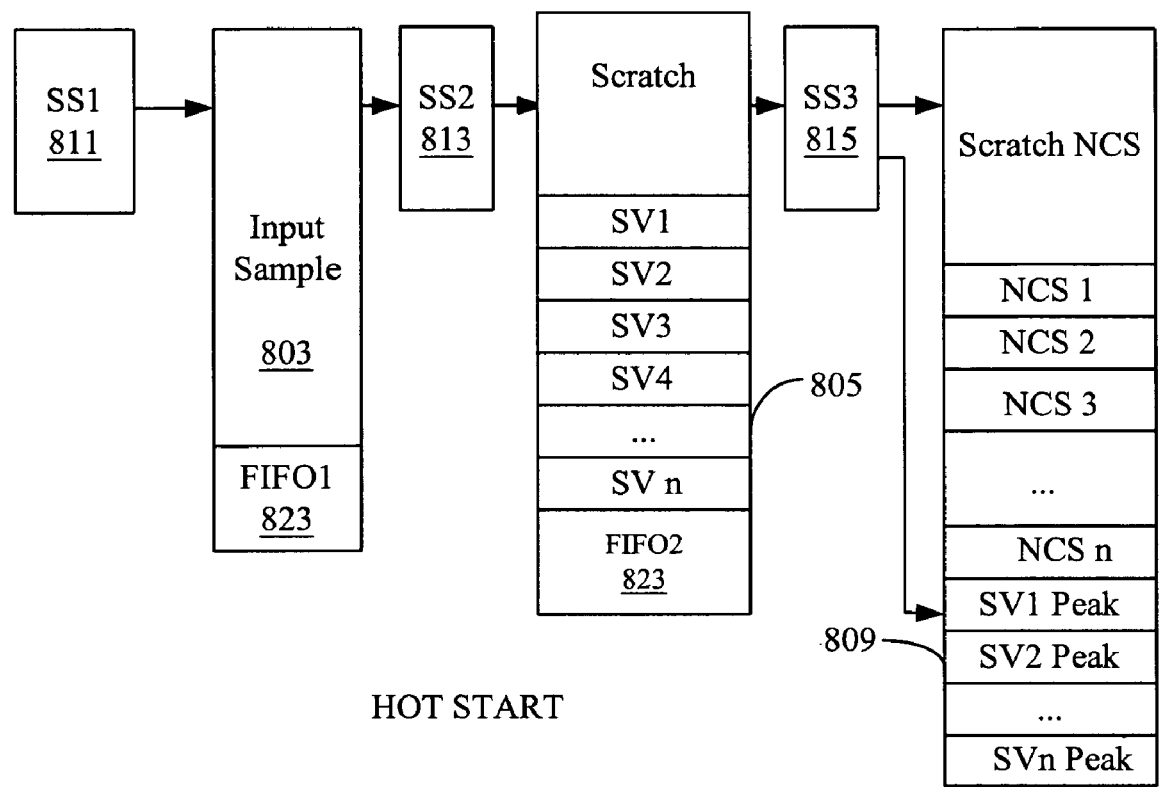
FIG. 8 is a block diagram illustrating a configuration of the signal processing component, including memory allocations, for a hot start mode.

FIG. 8 is a block diagram of a configuration of the signal processing component 101, including memory allocation, in the hot start mode. In the hot start mode, a fall code phase search is not required. Position is known to a much greater degree than is the case for cold start mode or coarse acquisition mode. For example, the time uncertainty is approximately one microsecond. The position uncertainty might be a cell site radius in a cellular network. Some aiding information might also be available to narrow the initial location uncertainty.

In the hot start mode, an input sample RAM 803 is a relatively short circular buffer. For example, the input sample RAM 803 is 5K-20K of memory. In the hot start mode, the input sample subsystem 811 receives input data samples and stores them in the input sample RAM in a circular buffer manner. The signal processing subsystem 813 processes the input sample data and stores it in a coherent RAM 805. In this mode, the coherent RAM 805 contains many small, dedicated regions for individual satellites. In addition, the coherent RAM 805 includes a scratchpad, or scratch, portion that can be used by various channels concurrently, in other modes than the hot start mode. As previously described, Scratchpad data is written for one channel in any available part of the scratchpad area, and later overwritten when another channel (which may be the same channel) writes into the scratchpad area. In contrast, dedicated areas can only be written or overwritten by data relevant to one SV.

Dedication of the areas in the coherent RAM 805 for individual satellites allows a smaller input sample buffer 803 and the ability to still run a relatively large PDI. In this mode, the input sample RAM 803 can be less than PDI. The FFT subsystem 815 processes the coherent data from the coherent RAM 805, and outputs NCS data which is stored in a backend storage RAM 809 in a dedicated fashion. That is, the backend storage RAM 809 is divided into dedicated regions, NCS 1, NCS 2, etc., for individual satellites. The backend storage RAM 809 also includes a scratch portion that is not dedicated, and can be used by other channels in other modes concurrently. The backend storage RAM 809 also includes a dedicated peak portion to save peaks on an SV-by-SV basis. As an example, the configuration of the signal processing component 101 for the cold start mode can include parameters of the following approximate values: a PDI of 10 or 20 milliseconds; a frequency coverage per processing run of 750 Hz; and a sensitivity of 15 to 12 dbHz.

Figure 9:
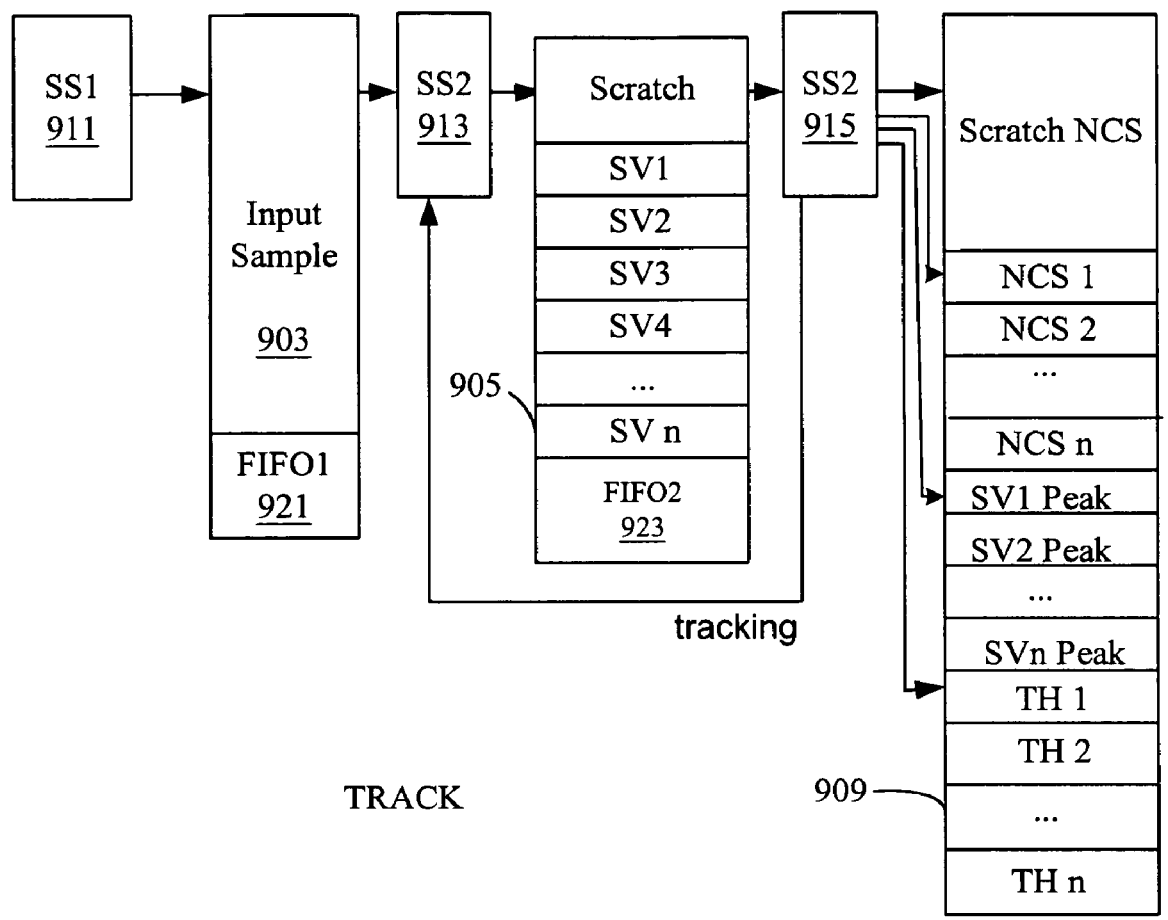
FIG. 9 is a block diagram illustrating a configuration of the signal processing component, including memory allocations, for a tracking mode.

FIG. 9 is a block diagram of a configuration of the signal processing component 101, including memory allocation, in the track mode. In the track mode, the signal processing component 101 has excellent information about its position, and is tracking satellites it has already acquired. In the track mode, it is possible to turn off more of the signal processing component 101 functionality, thus consuming less power.

In the track mode, the input sample RAM 903 is relatively small. For example, in one embodiment, the input sample RAM 903 is approximately 20K of memory. The input sample RAM 903 is smaller than PDI, for example, about 5 milliseconds. The input sample subsystem 911 stores input data samples in the input sample RAM 903 in a circular buffer fashion. The signal processing subsystem 913 processes the input data samples from the input sample RAM 903 and stores them in a coherent RAM 905, which is larger than PDI. The coherent RAM 905 includes a scratch region, which can be shared among different channels in different modes concurrently, and a dedicated region for storing coherent data on a satellite-by-satellite basis. The FFT subsystem 915 processes the coherent data from the coherent RAM 905 and stores NCS data in a backend storage RAM 909. The FFT subsystem 915 further feeds back data to the signal processing subsystem 913, such as the data boundary on the signal, to be evaluated and used as a basis for possible adjustment of tracking.

The backend storage RAM 909 includes a scratch region that can be shared among different channels in different modes concurrently, a dedicated peak region, and a track history (TH) region that stores various data as further described below. The dedicated NCS region stores NCS data for each satellite in a dedicated region, and the dedicated peak region stores peaks for each satellite in a dedicated region.

The track mode stores additional TH output data not stored in other modes. This TH data is used in various ways. For example, the TH includes coherent data that is used by a hardware tracker (not shown). The hardware tracker examines the coherent data to verify that the correct signals are being tracked. Adjustments can be made as necessary through the SW 219 and the channel RAM. Even though in track mode, a small search window is kept open by storing additional data selectively in the backend storage RAM 909. The search window is used to look for spurious large signals that may make the signal processing subsystem track wrong signals. The search window is also used to find new visible satellites as the visible satellites change.

As an example, the configuration of the signal processing component 101 for the track mode can include parameters of the following approximate values: a PDI of 4, 5, 10 or 20 milliseconds; a frequency coverage per processing run of 100 Hz-750 Hz; and a sensitivity of 12-50 dbHz.

Figure 10:
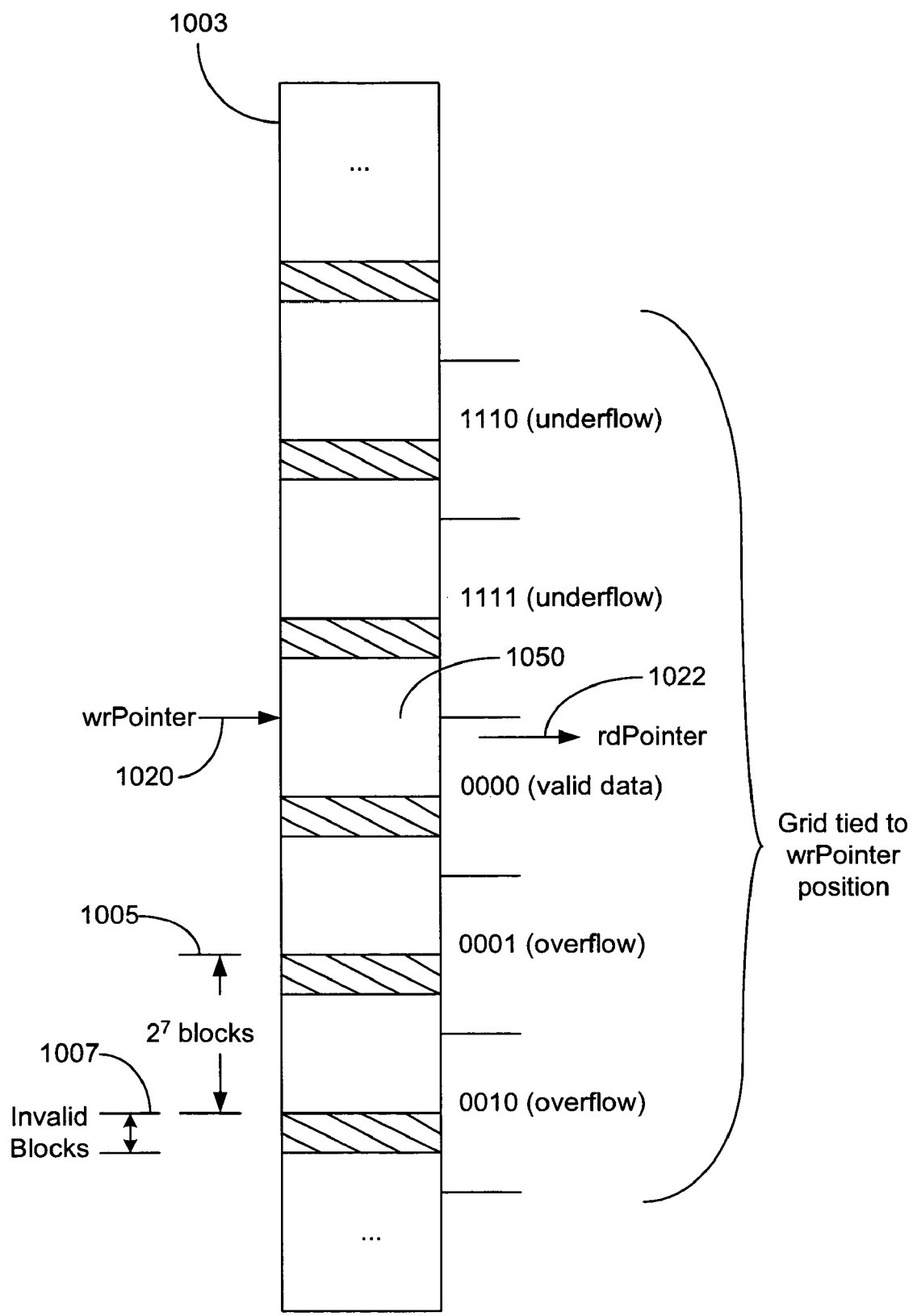
FIG. 10 is a block diagram showing some aspects of how data is stored in an input sample RAM.

FIG. 10 is a block diagram showing some aspects of how data is stored in an input sample RAM 1003. This diagram shows how regions of the dynamically configurable and allocable RAM 201 are allocated to the input sample RAM 203. A write pointer 1020 is shown on the left of the input sample RAM 1003, and a read pointer 1022 is shown on the right of the input sample RAM 1003. Each block of the input sample RAM 1003 that is represented as a clear (not cross-hatched) region is an actual address space used for the input sample RAM 203. A region denoted 1005 contains potentially valid data, and a subregion 1007 of invalid data, which is shown with hatching. In FIG. 10, the region of current valid data is denoted by 1050. The region 1050 is also the region to which the write pointer 1020 and the read pointer 1022 currently point, as shown. Overflow and underflow conditions are detected by comparing the value of the read pointer 1022 to the value of the write pointer 1020.

Each block region 1005 represents an entire address space with an invalid block 1007. Each block region 1005 includes the same addresses. For example, if a wrap pointer is tied to the top of the address, the address keeps incrementing as one progresses up the diagram. If one physically goes from the bottom block region 1005 to the block region 1005 immediately above it, one is going to the bottom of the address space. That is, the same address space is stacked over and over. The region cross-hatched invalid block regions 1007 are part of the full binary range that may not be used because of binary addressing. The invalid block regions 1007 are skipped.

On the right of the input sample RAM 1003, different regions are denoted, including the valid data region 1050, and regions in which underflow and overflow conditions would occur for a given write pointer 1020.

Figure 11:
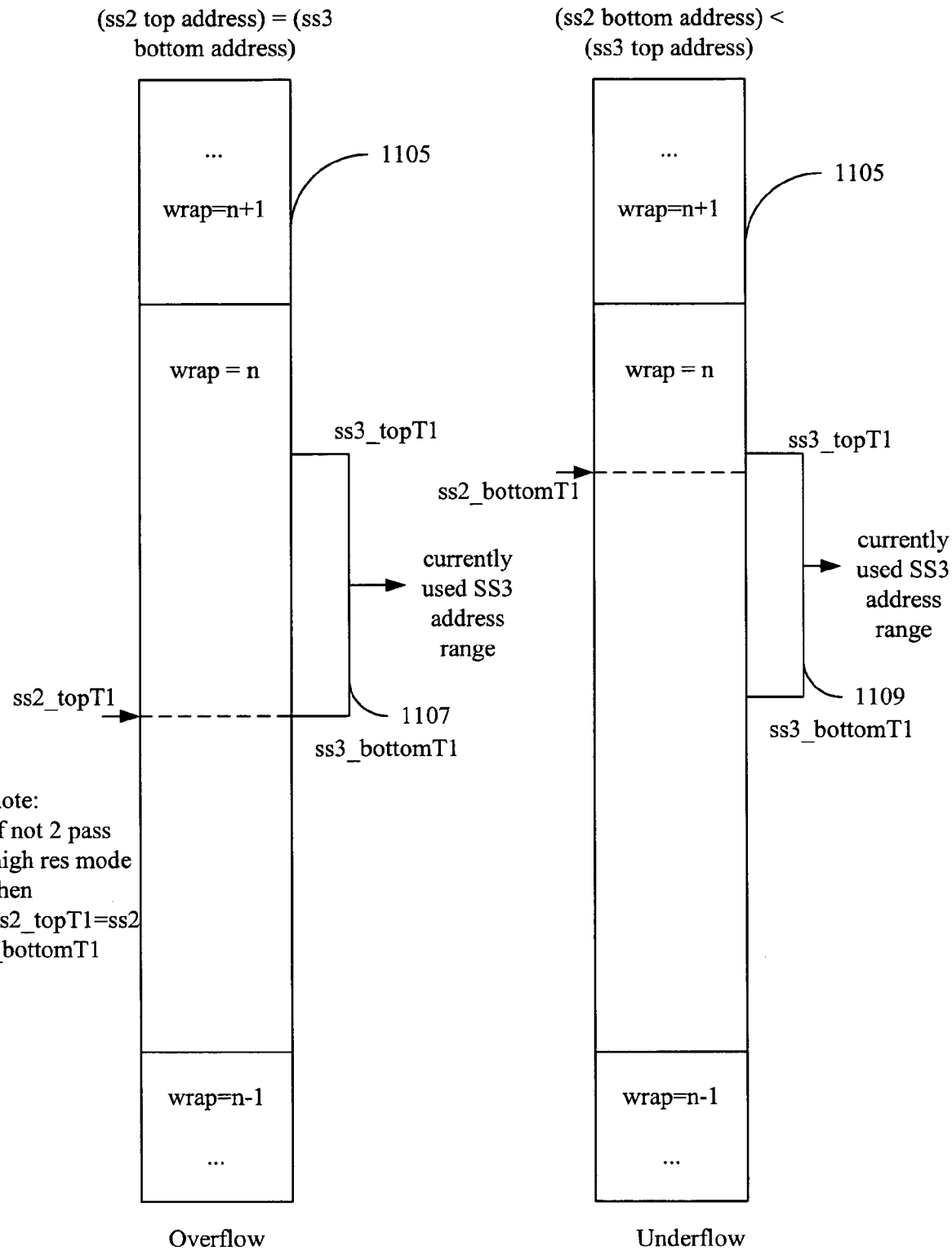
FIG. 11 is a diagram illustrating overflow and underflow conditions for a coherent RAM.

FIG. 11 is a diagram illustrating overflow and underflow conditions for a coherent RAM 1105. With reference also to FIG. 2, the FFT subsystem 215 accesses an entire range of addresses at one time in the coherent RAM 205. If the address range is not available, the FFT subsystem 215 stalls with an underflow. The diagram of FIG. 11 shows underflow and overflow conditions in the coherent RAM 1105 given the desire to access ranges of addresses. On the left side of FIG. 11, overflow is illustrated. A rectangle 1107 defines a currently used FFT subsystem 215 address range in the region labeled wrap=n. The total address range for the coherent RAM 1105, as previously described with reference to FIG. 10 and the input sample RAM 1003, is stacked and repeated. This is represented by the wrap number in FIG. 11. Overflow will be reached where an SS2_topT1 pointer as shown on the left is trying to write into a region from which the FFT subsystem 215 (SS3) is trying to read data out. The FFT subsystem 215 will be stalled when the SS2_topT1 pointer reaches the region where the FFT subsystem 215 (SS3) is trying to read. An overflow occurs when (SS2 top address)= (SS3 bottom address). It is possible to stall the FFT subsystem 215 because access to the coherent RAM is controllable through the FIFO2 223. Less control over the input sample RAM 203 is possible because it is not possible to control the live RF input.

The right side of FIG. 11 shows the underflow condition. A rectangle 1109 defines a currently used FFT subsystem 215 address range in the region labeled wrap=n. ss2_bottom has not reached the top of the address range needed by the FFT subsystem (SS3) 215. The required range is not "full" yet. An underflow occurs when (ss2 bottom address)<(ss3 top address).

Figure 12:
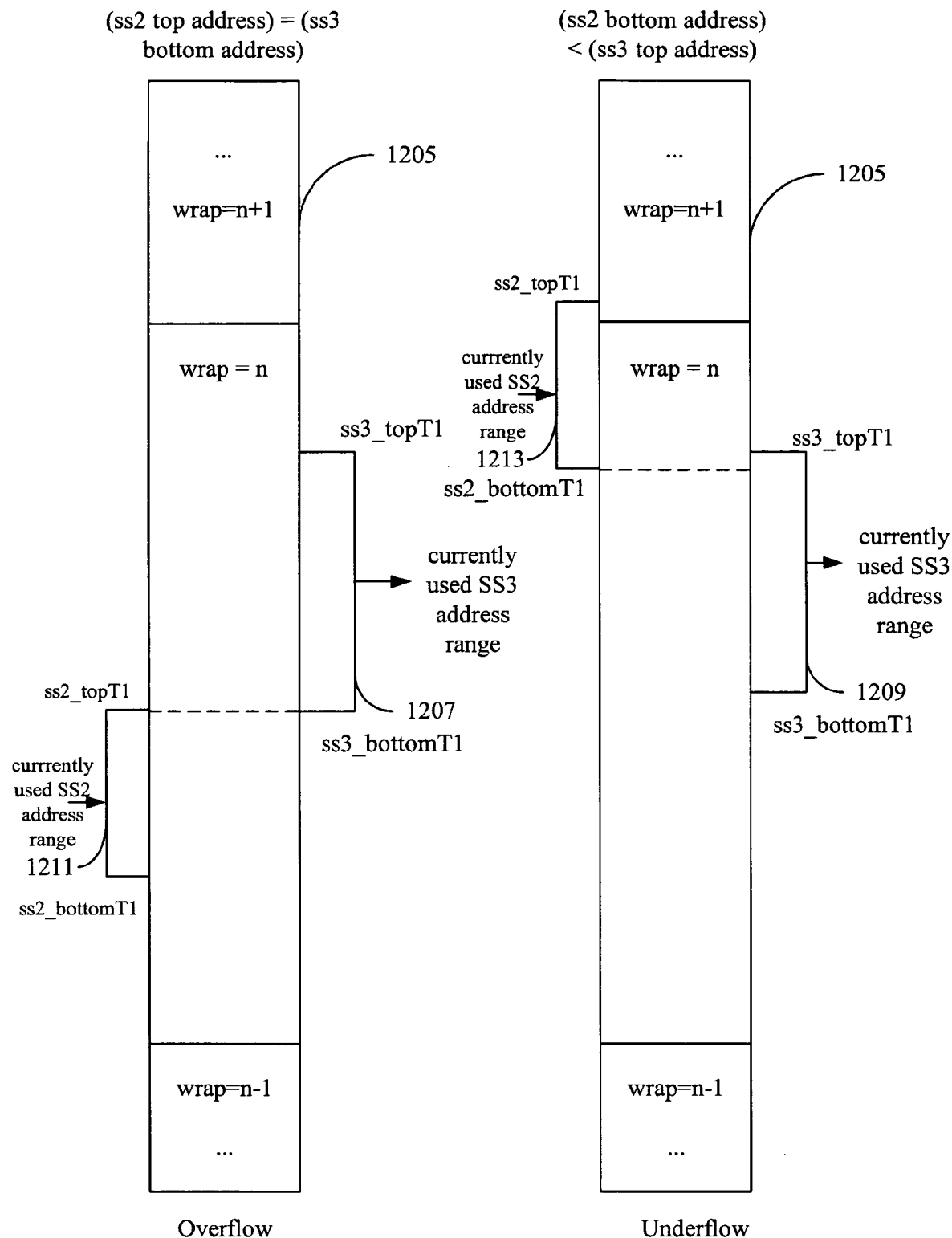
FIG. 12 is a diagram illustrating overflow and underflow conditions for a coherent RAM 1205 in a two-pass, high resolution mode, such as the track mode.

FIG. 12 is a diagram illustrating overflow and underflow conditions for a coherent RAM 1205 in a two-pass, high resolution mode, such as the track mode. In a two-pass mode data is written from ss2_bottom to ss2_top. Then the data in that entire range is reused by returning to the bottom and reprocessing the data from the bottom of the range to the top of the range. It has been stated that the FFT subsystem 215 uses blocks of data, and therefore waits for an entire block to be available before it reads and processes the data. In the two-pass mode, this is also true of the signal processing subsystem 213. In the two-pass mode, the signal processing system 213 is treated as needing access to an entire block or address range at one time. So then overflow occurs in this mode when the top of the region the signal processing subsystem 213 is attempting to access reaches the bottom of the area where the FFT subsystem 215 is trying to read data out. The signal processing subsystem 213 writes into the entire rectangle region 1211. This writing operation is actually an accumulation in which least significant bits (LSBs) are written from the bottom of the range to the top of the range in a first pass, and most significant bits (MSBs) are added from the bottom of the range to the top of the range in a second pass.

The right side of FIG. 12 shows the underflow condition in a two-pass, high resolution mode. A rectangle 1209 defines a currently used FFT subsystem 215 address range in the region labeled wrap=n. A rectangle 1213 defines a currently used signal processing subsystem 213 address range in the region labeled wrap=n. An underflow condition occurs when SS3_topT1 passes (goes above) SS2_bottomT1. That is, and underflow occurs when the FFT subsystem 215 attempts to read out a location above the location that the signal processing subsystem 213 is writing.

Determination of underflow or overflow involves comparing address pointers of the signal processing subsystem 213 and the FFT subsystem 215. Access to the signal processing subsystem 213 and the FFT subsystem 215 is time multiplexed between different channels. When address pointers are compared, it is necessary to know whether a single channel is operating in the signal processing subsystem 213 and the FFT subsystem 215. If both the signal processing subsystem 213 and the FFT subsystem 215 are currently operating in the same channel, "live" address pointers are compared. If both the signal processing subsystem 213 and the FFT subsystem 215 are not concurrently operating in the same channel, stored pointers (from the channel RAM 207) are compared. With reference, for example, to FIG. 11, if the signal processing subsystem 213 and the FFT subsystem 215 are both active in the same coherent buffer region, then live address pointers are used instead of stored address pointers.

In some instances, the coherent RAM 205 and/or the backend storage RAM 109 are shared between multiple channels. This may be viewed as effectively having multiple coherent RAMs and multiple backend storage RAMs. This allows multiple channels to coherently accumulate in the same memory regions consecutively. That is, there are different modes of sharing memory such that, for example, in one mode a coherent RAM is dedicated to a channel for the duration of a context, while in another mode, the coherent RAM is shared between different channels (where a channel is using a particular subsystem during a context). However, if the signal processing subsystem 213 and the FFT subsystem 215 are trying access the same shared coherent RAM, live address pointers are used. The signal processing subsystem 213 knows whether the same coherent RAM region is being used by looking at the base address pointer for the coherent RAM.

Figure 13:
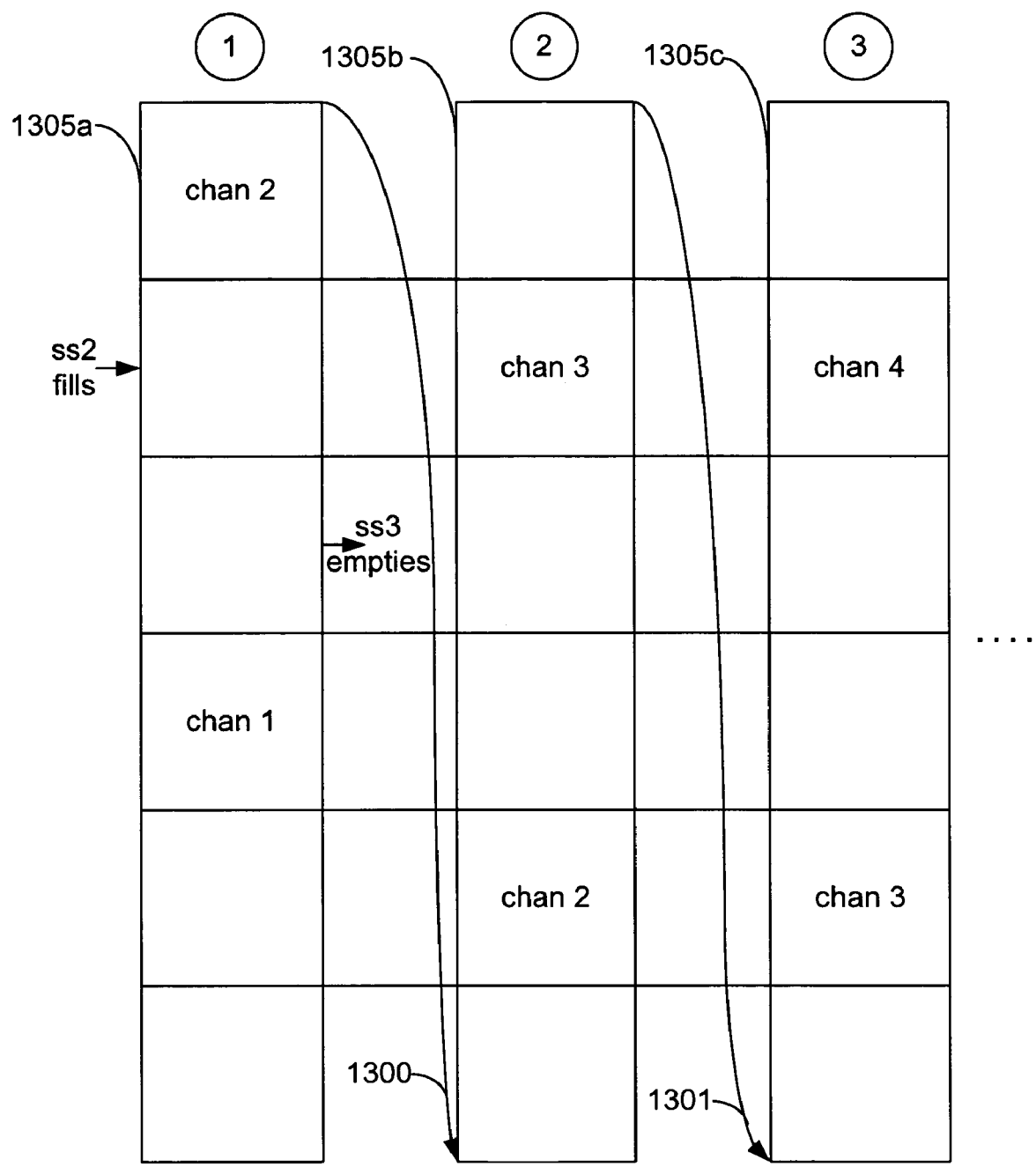
FIG. 13 is a block diagram illustrating an example of a single coherent RAM being shared between multiple channels.

FIG. 13 is a block diagram illustrating an example of a single coherent RAM being shared between multiple channels. This is an advantageous mode of memory usage when a relatively large memory area is allocated for the coherent RAM, but the signal processing system is particularly memory limited. The example of FIG. 13 shows a coherent RAM 1305 in three different time positions, labeled with circled numbers 1-3. Referring first to time position 1, the coherent RAM 1305a is written from the bottom to the top. An area for channel 1 and a partial area for channel 2 are shown. The signal processing subsystem 213 (SS2), as shown by the "ss2 fills" arrow, writes channel 1 data into the channel 1 area. The FFT subsystem 215 (SS3) reads data from the channel 1 area after the signal processing subsystem 213 writes it in. When the signal processing subsystem 213 is finished writing channel 1 data, it moves on to the channel 2 area and begins writing channel 2 data. When the physical coherent RAM area designated by 1305a is filled, the signal processing subsystem moves to the bottom of the coherent RAM area, and begins overwriting. This is shown by the arrow 1300, which shows the path of the signal processing subsystem 213 as it continues to write channel 2 data at the bottom of the coherent RAM 1305b in the time position 2.

In the time position 2, the channel 2 data will be written, and the signal processing subsystem will start writing channel 3 data in the area labeled "channel 3". The channel 3 data does not fit in the remaining coherent RAM area, so in the time position 3 the signal processing subsystem 213 moves to bottom of the coherent RAM area and begins overwriting the previous channel 2 data, as shown by the arrow 1301. As explained previously, if the FFT subsystem 215 catches up to the signal processing subsystem 213 by attempting to read data that the signal processing subsystem 213 has not yet written, the FFT subsystem 215 is stalled, or an underflow error condition occurs.

In one embodiment, some conditions should be met for using a shared coherent RAM mode as illustrated in FIG. 13. For example, the channels sharing the coherent RAM should have the same size T1s, although they may have PDIs of different sizes. The signal processing subsystem 213 should completely write the PDIs of one context before it leaves the context. Each subsystem using the shared coherent RAM should begin with its own stored pointers. In one embodiment, the pointers are stored in a designated region of the coherent RAM itself. Upon exiting the shared coherent RAM, each channel updates it own stored pointers.

In other embodiments, the coherent RAM area may also share a designated physical memory area with a cold start mode backend storage RAM. This is possible because in cold start mode, the backend storage RAM is a "throw-away" RAM in that it is filled, the peaks are determined from the data, and the data is not needed again. In this case, the designated memory area should be used for NCS data after the coherent data has been used, or processed. NCS data is written into the coherent RAM area in this case, but the coherent data pointers are not updated by NCS usage. The designated shared region for coherent data and NCS data should be less than two PDIs worth of data to avoid the possibility of the FFT subsystem processing data outside of its memory area.

Figure 14:
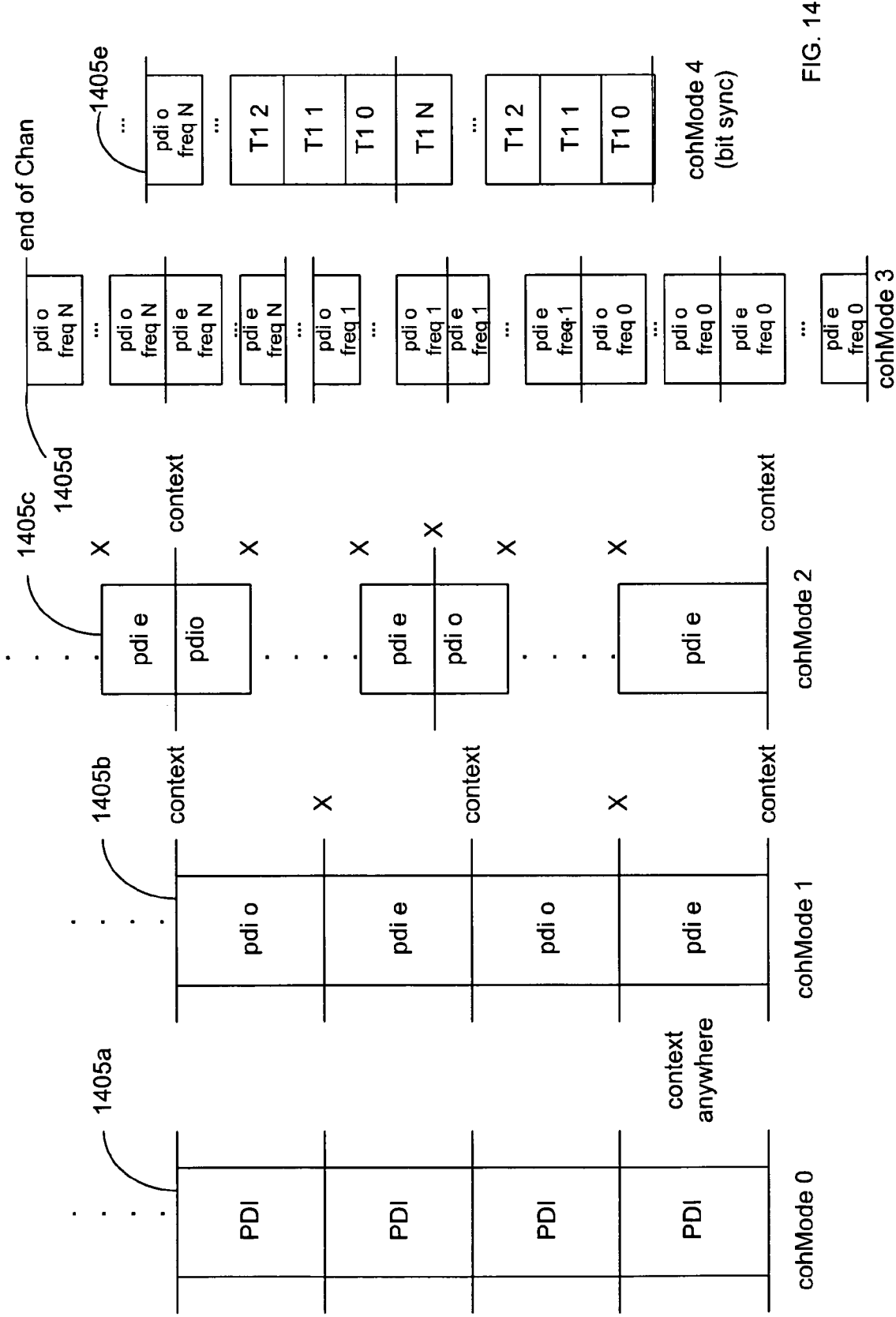
FIG. 14 is a block diagram illustrating various modes of storing data in an allocated coherent data memory area, or coherent RAM.

FIG. 14 is a block diagram illustrating various modes of storing data in an allocated coherent data memory area, or coherent RAM. At the left side of FIG. 14, in a first coherent RAM storage mode zero, a coherent RAM 1405a is written by the signal processing subsystem 213 from bottom to top, one PDI at a time. A context may be completed at any point.

In a coherent storage mode 1, the signal processing subsystem 213 writes a PDI of even half-chips, and then writes a PDI of odd half-chips in a coherent RAM 1405*b*. The context is then finished, and the storage of data from another context continues with even half chips and then odd half chips. Writing of the coherent RAM 1405*b* starts at the bottom and continues to the top.

In a coherent storage mode 2, the signal processing subsystem 213 stores multiple PDIs of even half chips alternating with multiple PDIs of odd half chips for one context in a coherent RAM 1405*c*. The signal processing subsystem then continues storing data in another context from the "context" line. The context lines show where data is stored by the signal processing subsystem 213 during a context in which a particular channel has possession of the signal processing subsystem 213.

In a coherent storage mode 3, the signal processing subsystem 213 stores multiple PDIs of even half-chips for a first frequency (freq 0), then multiple PDIs of odd half-chips for frequency 0 in a coherent RAM 1405*d*. Then the signal processing subsystem 213 stores multiple PDIs of even half-chips for a next frequency (freq 1), then multiple PDIs of odd half-chips for frequency 1, and so forth.

In a coherent storage mode 4, the signal processing subsystem 213 stores all the coherent data for a T1 0, then all the coherent data for a T1 1, in a coherent RAM 1405*e*. Storage continues in this fashion until the data for the final T1 is stored. The number of T1s to be stored is predetermined by software. The coherent storage mode 4 is useful in a bit synch mode in which different code offsets are stored in order to facilitate finding a data bit edge in the satellite data stream. Storage for a context may end anywhere.

Figure 15:
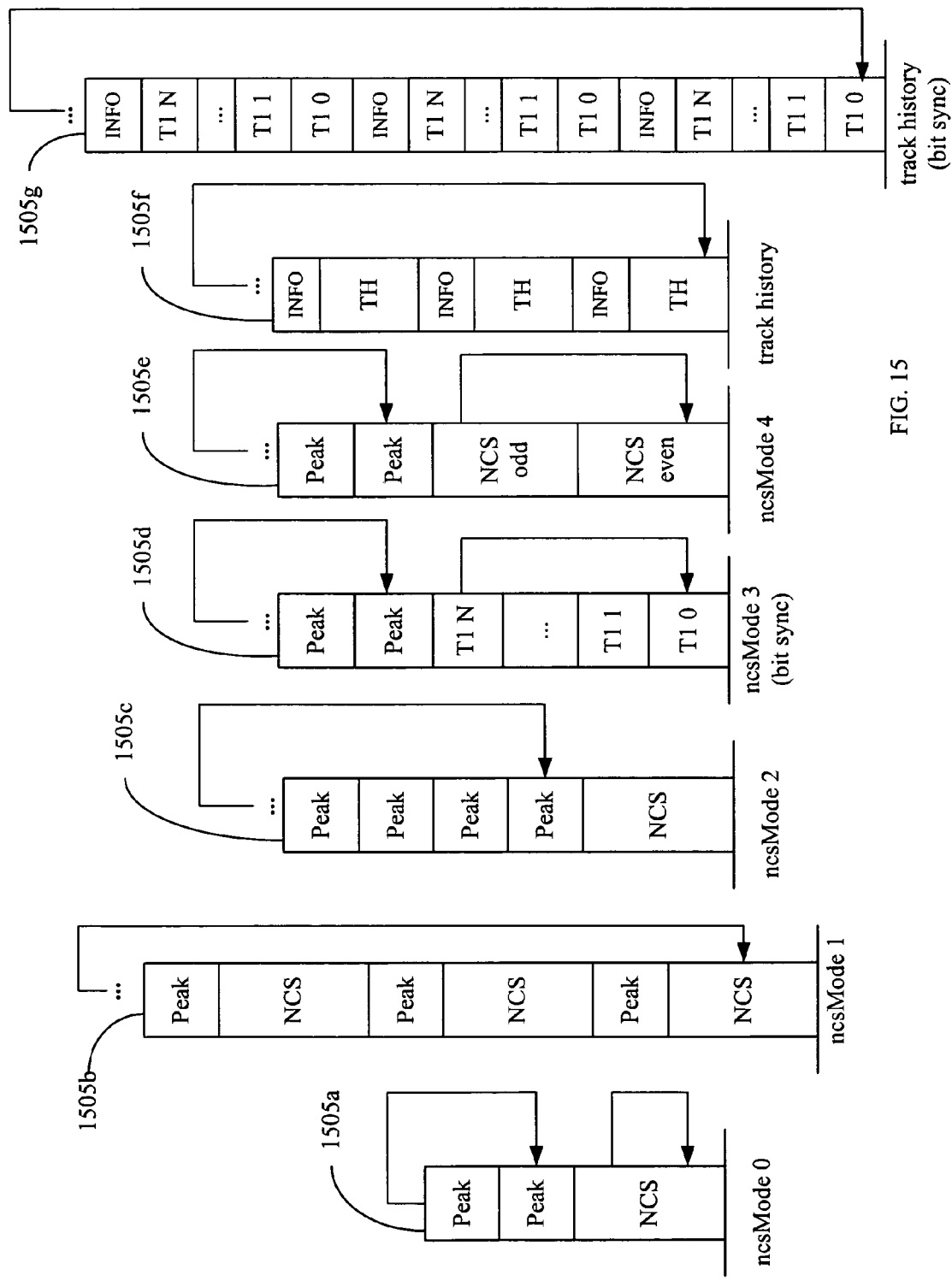
FIG. 15 is a block diagram illustrating various modes of storing data in an allocated NCS data memory area, or back-end storage RAM.

FIG. 15 is a block diagram illustrating various modes of storing data in allocated areas of the backend storage RAM. In an NCS mode 0, the FFT subsystem 215 (SS3) stores noncoherent data in an NCS area, and peak data for a particular channel in a peak area as shown. At the end of PDI, the peak data storage moves to a new peak region, as shown. In one embodiment, the backend storage RAM 1505*a* has two peak locations within the peak area, but can have more than two in other embodiments.

In an NCS mode 1, the FFT subsystem 215 (SS3) stores noncoherent data in NCS areas of a backend storage RAM 1505*b*, and associated peak data in peak areas of the backend storage RAM 1505*b*, as shown. The peaks are updated when the NCS data is updated.

In an NCS mode 2, the backend storage RAM 1505*c* is used as a scratch buffer region. The FFT subsystem 215 (SS3) stores noncoherent data in an NCS area of a backend storage RAM 1505*c*, and peak data peak areas of the backend storage RAM 1505*c*, as shown. The peak data is updated at the end of every PDI, but the write pointer is advanced at the end of the NCS data. Because the NCS storage mode 2 is a scratch mode, the NCS data is overwritten, for example, on a half-chip basis, on a frequency basis, etc.

In an NCS mode 3, the FFT subsystem 215 (SS3) stores noncoherent data on a T1 basis in NCS areas of a backend storage RAM 1505*d*, and peak data in peak areas of the backend storage RAM 1505*d*, as shown. The peak data is updated at the end of every PDI, including the peak address locations. The arrows indicate the direction in which the write pointer moves when the top of an area has been reached. The NCS mode 3 is useful in a bit synch mode in which different code offsets are stored in order to facilitate finding a data bit edge in the satellite data stream.

In an NCS mode 4, the FFT subsystem 215 (SS3) stores odd and even half chips of noncoherent data in NCS areas of a backend storage RAM 1505*e*, and peak data in peak areas of the backend storage RAM 1505*e*, as shown. One odd PDI and one even PDI are stored per context. The peak values are updated after the even and odd PDI data is stored. The peak address locations are updated at the end of every PDI. The arrows indicate the direction in which the write pointer moves when the top of an area has been reached.

As shown, for example in FIG. 2, the track history (TH) data is stored in a TH region of the backend storage RAM 209. The RAM 1505*f* in FIG. 15 shows one mode of track history storage. Track history (TH) is stored in TH areas, and report information (INFO) is stored in INFO areas, as shown. The TH data is actual coherent data. The INFO data includes report information. Report information includes various reports, such as a TH report that identifies the coherent track history data and indicates the number of PDIs processed, timetags, etc. The bias sum is a continuous sum of bias over all of the PDIs. The noise sum is a continuous sum of noise magnitudes over all of the PDIs. Another report is a context report that is stored at the time of context switch. The context report includes a timetag, a number of PDIs processed, a bias sum, a noise sum, etc.

A RAM 1505*g* in FIG. 15 shows another mode of track history storage. Track history (TH) is stored in TH areas, and report information (INFO) is stored on a T1 basis in INFO areas, as shown. The TH data is actual coherent data for distinct T1s. The INFO data includes report information. Report information includes various reports, including a TH report that identifies the coherent track history data (e.g., by phase offset and code offset) and indicates the number of PDIs processed, timetags, etc. The bias sum is a continuous sum of bias over all of the PDIs. The noise sum is a continuous sum of noise magnitudes over all of the PDIs. Another report is a context report that is stored at the time of context switch. The context report includes a timetag, a number of PDIs processed, a bias sum, a noise sum, etc. The track history storage mode of the backend storage RAM 1505*g* is useful in a bit synch mode in which different code offsets are stored in order to facilitate finding a data bit edge in the satellite data stream.

The storage modes of FIGS. 14 and 15 are dictated by the channel parameters, which are stored in the channel RAM 207 by the sequencer 217.

Figure 16:
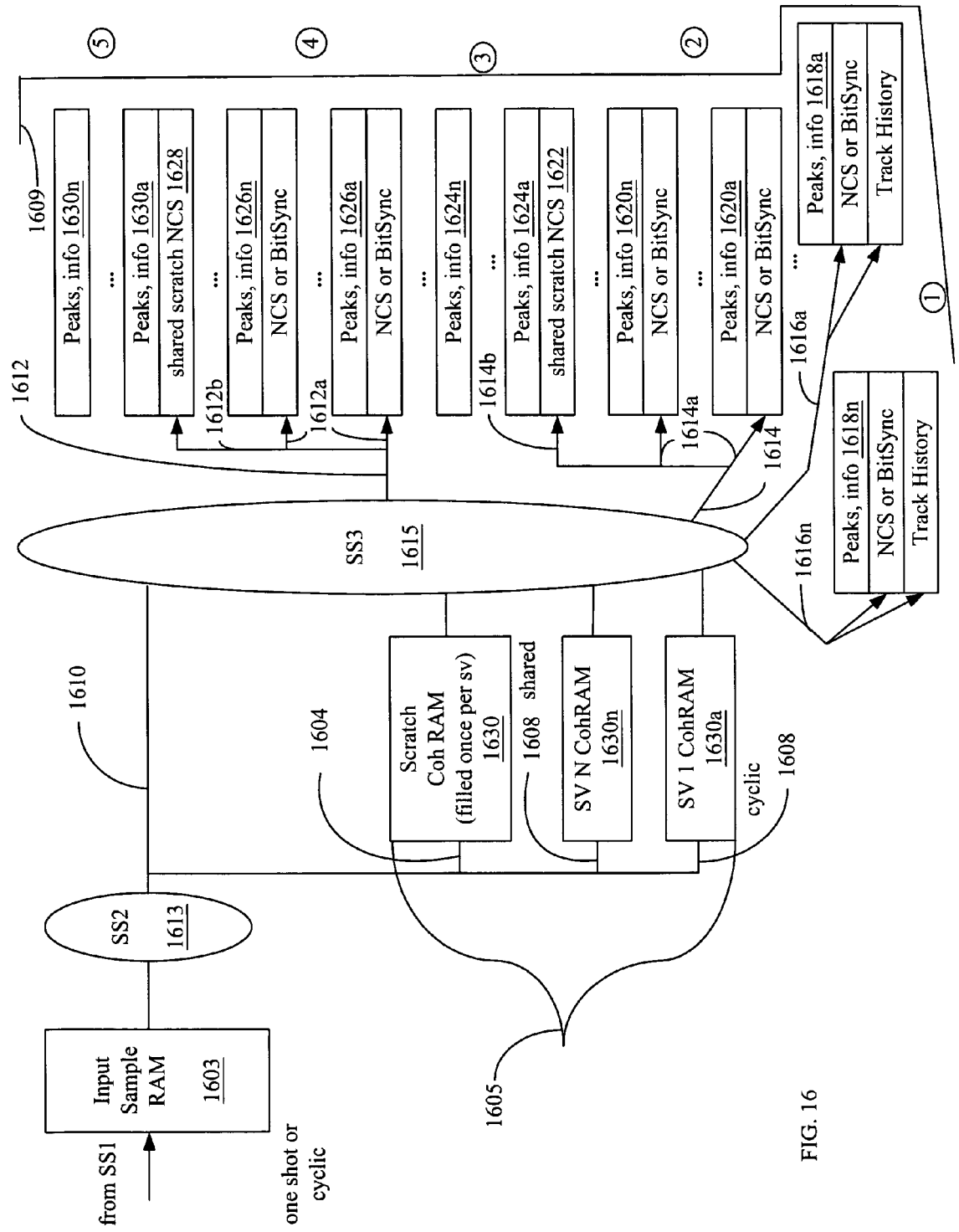
FIG. 16 is a diagram illustrating the concept of various modes of RAM storage in different operational modes.

FIG. 16 is a diagram that illustrates various modes of RAM storage in different operational modes. On the left of the diagram, an input sample RAM 1603 is filled with input data samples by an input sample subsystem (SS1). The input sample RAM can be filled in a cyclic mode or in a one-shot mode, as previously described. A signal processing subsystem (SS2) 1613 reads data from the input sample RAM 1603, and processes the data. The signal processing subsystem 1613 outputs coherent data on one of several possible data paths 1604, 1608, and 1610, according to the operational mode and configuration of the signal processing system.

Referring again to the output paths of the signal processing subsystem 1613, an output path 1604 represents a path to a shared, scratch area 1630 of the coherent RAM 1605. The scratch area 1630 is filled once per SV. Channels do not maintain their own coherent RAMs, meaning a channel writes the scratch area (overwriting the previous channel's data) and exits each time without regard for its previous location. The physical region of RAM designated for the scratch area 1630 may also be alternated between backend storage RAM (for cold start mode) and coherent scratch RAM (for all other modes).

An output path 1608 represents a path to an SV dedicated coherent data region of the coherent RAM 1605. Coherent data is stored for each SV in a cyclic fashion starting at the bottom with SV1 data in a 1630*a* region and ending with SVn data in a 1630n region. This would be applicable, for example, when each channel maintained its own coherent RAM, entering the coherent RAM at the same place it previously exited. The SV dedicated region 1630 can also be occasionally used as scratch area.

An output path 1610 represent a path straight to an FFT subsystem 1615 (SS3), bypassing a coherent RAM 1605. This is applicable to the cold start mode. In the cold start mode, the FFT subsystem 1615 processes the coherent data, and sends NCS data to a backend storage RAM 1609 via a path 1612.

Referring now to the area to the right of the FFT subsystem 1615, different configurations of a backend storage RAM 1619 are represented. The circled numbers on the far right of the diagram indicate various types or modes of NCS storage. Storage mode 1 at the bottom of the diagram includes each channel having its own dedicated area of TH and noncoherent data storage. The FFT subsystem 1615 sends data to individual channel areas of the backend storage RAM 1609 via the paths 1616a-1616n. The channel-dedicated backend storage RAM areas 1618a-1618n contain peaks, peak information, NCS data, including bit synch data, and track history data.

Referring to storage mode 2, each NCS region 1620a-1620n, has its own corresponding peak region. The FFT subsystem 1615 sends data to the NCS region 1620 via the path 1614a from the shared, scratch coherent RAM 1630. An alternative NCS storage mode that is also appropriate for the path 1614, is storage mode 3. In the storage mode 3, there is a single scratch region 1622, shared among channels, and several dedicated peak regions 1624a-1624n via a path 1614b.

A storage mode 4 is similar to the storage mode 2 in that it includes multiple NCS regions 1626a-1626n, each with its own corresponding peak region. The FFT subsystem 1615 stores NCS data, including bit synch data, peaks and peak information, in the backend storage RAM region 1626 via a path 1612a. An alternative NCS storage mode that is also appropriate for the path 1612, is storage mode 5. In the storage mode 5, there is a single scratch region 1628, shared among channels, and several dedicated peak regions 1630a-1630n via a path 1612b.

A more detailed discussion of the control method and apparatus of the digital signal processing component 101 follows. A sequencer, which controls the sequencing of signal processing operations in the digital signal processing component, has been discussed with reference to the sequencer 217 and the digital signal processing component 101 of FIG. 2. In another embodiment, the sequencer for a signal processing subsystem is collocated with the signal processing subsystem, and the sequencer functionality for an FFT subsystem is collocated with the FFT subsystem. Such an embodiment is shown in FIG. 3. The following figures and discussion are applicable to either of these types of embodiments, or alternative embodiments that are not shown. As previously stated, the sequencer reads data from the channel RAM, which is programmed by software. The channel RAM stores information regarding current status of a digital signal processing component, such as the digital signal processing component 101. The channel RAM also stores information regarding what aspects of the signal processing are to occur next, including what the configurations of the different hardware elements are to be.

Figure 17:
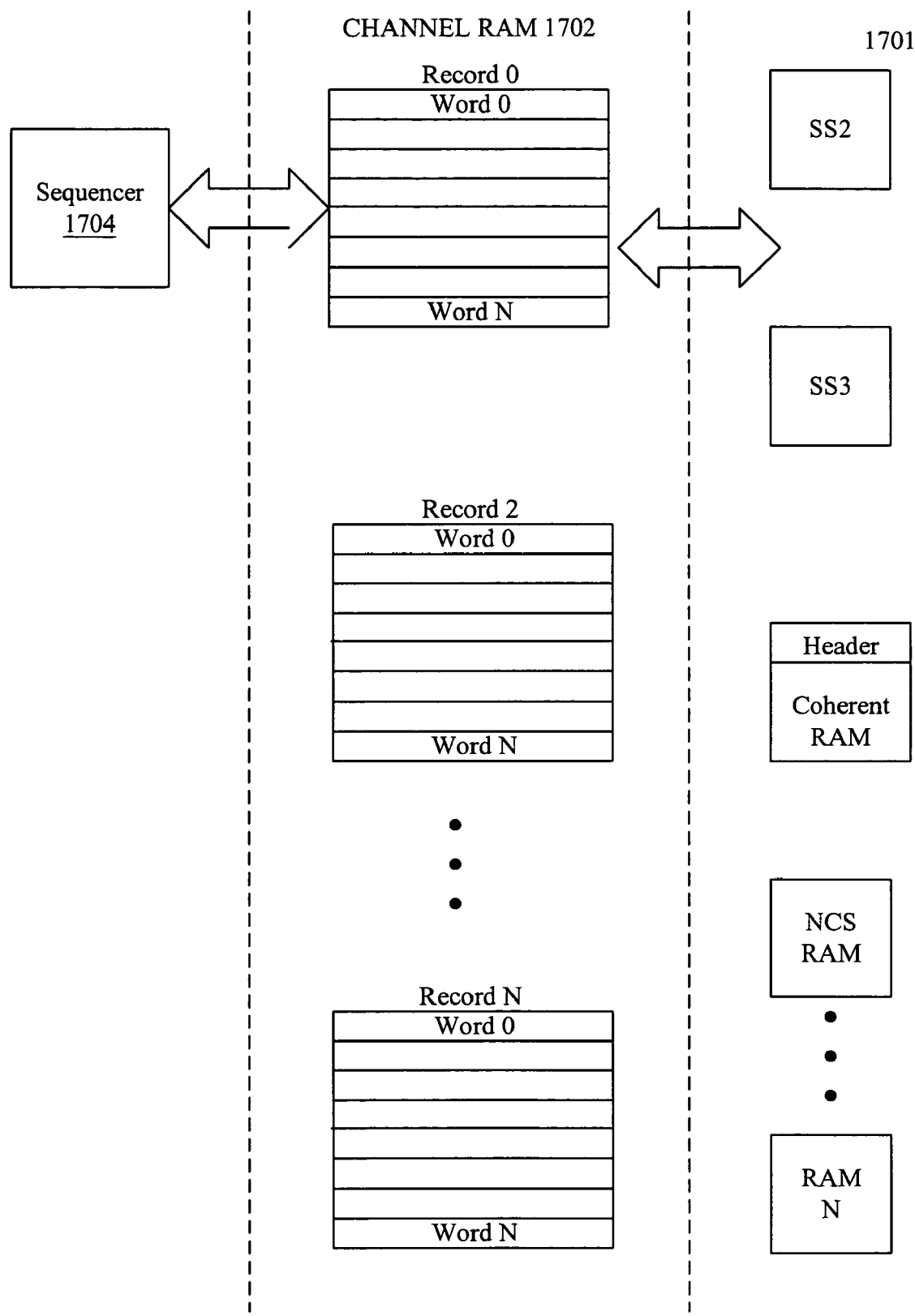
FIG. 17 is a block diagram illustrating a channel RAM and elements with which it communicates in one embodiment.

FIG. 17 is a block diagram illustrating a channel RAM 1702 and elements with which it communicates in one embodiment. The dashed lines on the right and left of the diagram conceptually show the communication between the channel RAM 1702 and a sequencer 1704 (on the left of the diagram), and the channel RAM 1702 and various other elements of a digital signal processing component such as the digital signal processing component 1701 (on the right of the diagram). The relative locations of the elements in the diagram and the dashed lines are not significant. For example, the sequencer could actually be located with either of the subsystems shown, or could be partially located with one subsystem 2 (SS2) and partially located with subsystem 3 (SS3). Any other relative arrangement of different elements is possible. As previously stated, SS2 denotes a signal processing subsystem, and SS3 denotes an FFT subsystem.

The channel RAM 1702 sends data to, and receives data from, the sequencer 1704, the signal processing subsystem, the FFT subsystem, the portion of RAM allocated to coherent data, the portion of RAM allocated to NCS data, and other portions of RAM allocated for data such as track history (TH), peaks, etc.

The channel RAM stores multiple channel records, labeled record 0 through record N. Each of the channel records contains multiple data words labeled word 0 through word N. In one embodiment, each channel record includes approximately 256 bytes of data. Word 0 in each channel record includes a pointer to the next channel record to be read from or written to. The pointer is used to move from one channel record to another. The channel record also contains all the possible operational modes, various types of signal processing being performed, current counts and states, and code phases and time alignments relative to the input samples. This information is sent as signals to the various elements shown to control processing or to signal error conditions.

The sequencer 1704 begins with word 0 in a channel record and "runs" the contents. The contents of a channel record (word 0 through word N) include pointers to addresses in all of the relevant memory areas, which indicate where to get data from and where to write data to. The sequencer 1704 indicates which of the signal processing subsystem and the FFT subsystem have access to the channel RAM. The signal processing subsystem and the FFT subsystem run as separate execution threads, but are not completely independent. For example, the signal processing subsystem produces data for the use of the FFT subsystem. One of the subsystems should not run too far ahead or behind the other, as will be explained further below.

When the context is complete, updated information from the completed context is stored in the current channel record, and the sequencer moves to the record indicated in word 0 of the current channel record.

The RAM area allocated to coherent data stores, in addition to coherent data, a buffer header including parameters such as state information and further pointers. The signal processing subsystem and the FFT subsystem read their respective channel specific states from the header. For example, a subsystem might determine where it last left off in signal processing, or how many samples it is supposed to process. It is convenient to store these parameters in the coherent RAM area header because the parameters are passed from one channel to the next. For example, if the signal processing subsystem placed multiple data blocks for a next channel and exited, the FFT subsystem must know where to read the multiple blocks from. In one embodiment, a known number of blocks, for example seven, are always stored for a channel. When the subsystem for which the data blocks are intended comes in, the subsystem takes the seven data blocks; when it leaves, it writes the coherent RAM area header stating that seven more data blocks are ready.

Figure 18:
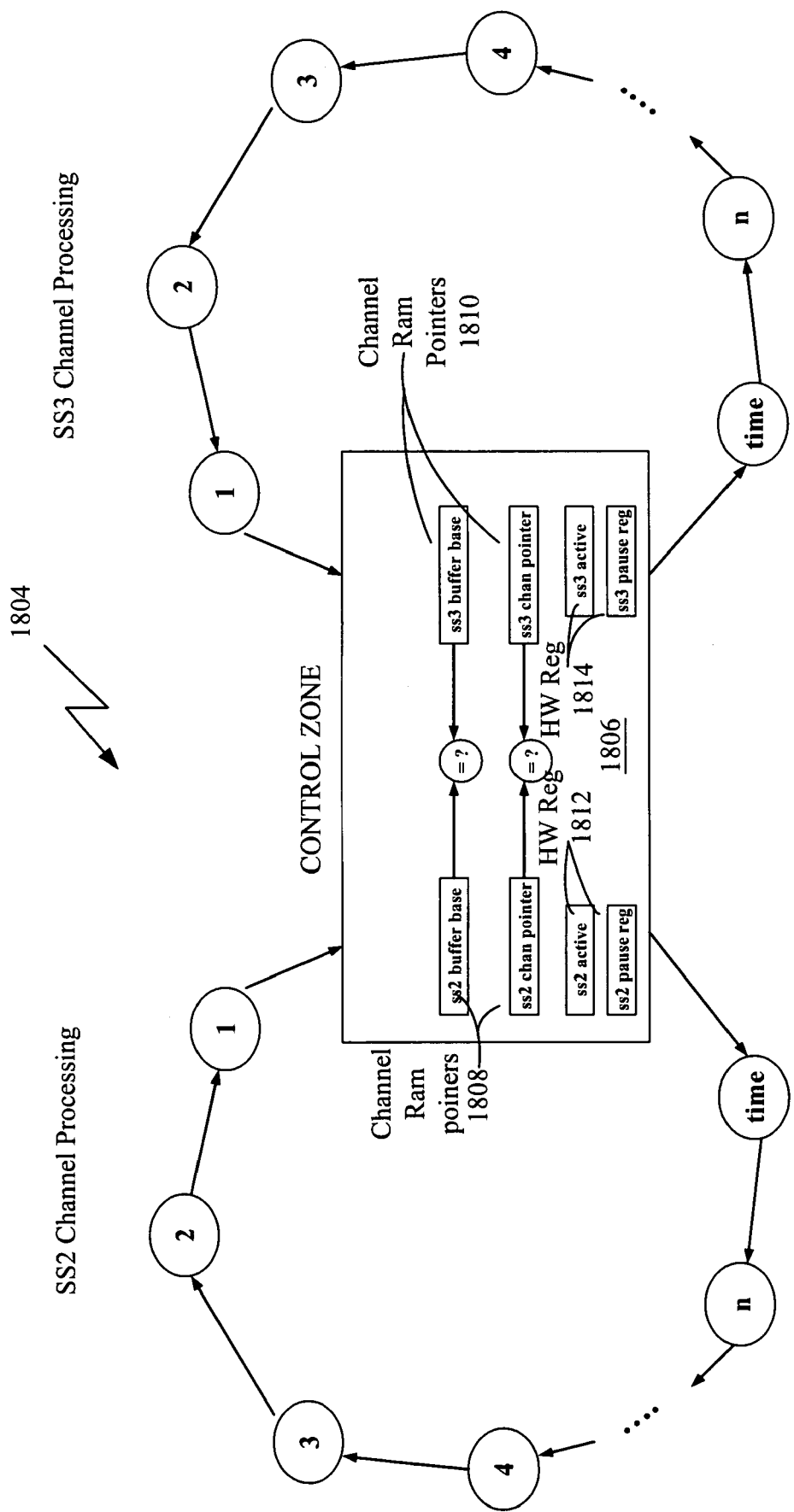
FIG. 18 is a block diagram illustrating a concept of channel sequencing control in one embodiment of a signal processing subsystem sequencer.

FIG. 18 is a block diagram which illustrates a concept of channel sequencing control 1804 in one embodiment of a signal processing subsystem sequencer. The control of a signal processing component, such as component 1701, by the sequencer 1704 includes communication among component elements and software using a semaphore word and interrupt signals. One of the aspects of signal processing component control is the sequencing of different channels that must use the hardware resources, including the signal processing subsystem (SS2), the FFT subsystem (SS3), and memory, or RAM. FIG. 18 shows SS2 processing on the left and SS3 processing on the right, with a "control zone" 1806 between the two subsystems. The bubbles labeled "time" through "1" represent stages of a processing epoch for each of the subsystems. During the processing epoch, a channel has possession of the subsystem. At the end of the processing epoch and before the start of a next processing epoch, the sequencer 1704 makes some determinations that include, among others, which channel gets possession of a subsystem for processing, which subsystem(s) have access to various allocated RAM areas, and particular address locations for RAM access.

Within the control zone 1806 are shown channel RAM pointers 1808 and 1810 for SS2 and SS3, respectively. The channel RAM pointers 1808 and 1810 include a buffer base pointer and a channel pointer for each of SS2 and SS3. The buffer base pointers represent actual locations in the coherent RAM. The channel pointers are the pointers stored in the channel RAM. As shown in FIG. 18, the SS2 base pointer is compared to the SS3 base pointer, and the SS2 channel pointer is compared to the SS3 channel pointer. For example, "channel 1" in SS2, compares its channel pointer to the channel pointer of "channel 2" when it enters SS2. This is to prevent one subsystem lapping another, as will be explained below with reference to lapping rules.

Also shown in the control zone 1806 are hardware registers 1812 and 1814 for each of SS2 and SS3, respectively. There is an "active" register and a "pause" register for each subsystem. These registers store signal bits indicating that the subsystem is active, and that the subsystem must pause processing, respectively.

The sequencer 1704 enforces lapping rules, which prevent the signal processing subsystem from lapping the FFT subsystem, or vice versa. FIFO1 and FIFO2 prevent and/or detect underflow and overflow conditions. Underflow, overflow, and lapping rules are aspects of sequencing and control that were previously alluded to and will now be described in more detail.

The FFT subsystem (SS3) performs underflow detection under different conditions as follows. If the signal processing subsystem (SS2) is in a memory area when SS3 enters, SS3 uses a live SS2 pointer. As long as SS2 is still in this memory area, SS2 continuously loads the live pointer into the location that is the bottom of the SS2 T1 memory space (SS2BottomT1REG). When SS2 leaves the memory area, SS3 switches to using the last saved pointer in the location SS2BottomT1Reg.

SS2 may not enter a channel again until SS3 leaves.

If SS2 is not in the memory area when SS3 enters, SS3 reads the stored SS2 pointer and loads it into SS2BottomT1Reg. SS3 then processes up to the stored SS2BottomReg, and exits.

The signal processing subsystem (SS2) performs overflow detection under different conditions as follows. If SS3 is not in the memory area when SS2 enters, SS2 reads the stored SS3 buffer pointer and loads it into SS3BottomT1Reg. SS2 processes as many T1s as commanded, and if it runs out of memory space it stalls due to overflow. If SS3 enters the memory area, then live SS3 pointers are used. If SS3 leaves the memory area, then the last saved SS3BottomT1Reg pointer is used until SS3 is back in the same memory area with another channel.

If SS3 is in the memory area when SS2 enters, SS2 uses live SS3 pointers up to the point where SS3 leaves and then switches to the last saved SS3BottomT1 Reg pointer. SS2 processes as many T1s as commanded, and if it runs out of memory space it stalls due to overflow. If SS3 enters the memory area, then live SS3 pointers are used. If SS3 leaves the memory area, then the last saved SS3BottomT1Reg pointer is used until SS3 is back in the same memory area with another channel.

Figure 19:
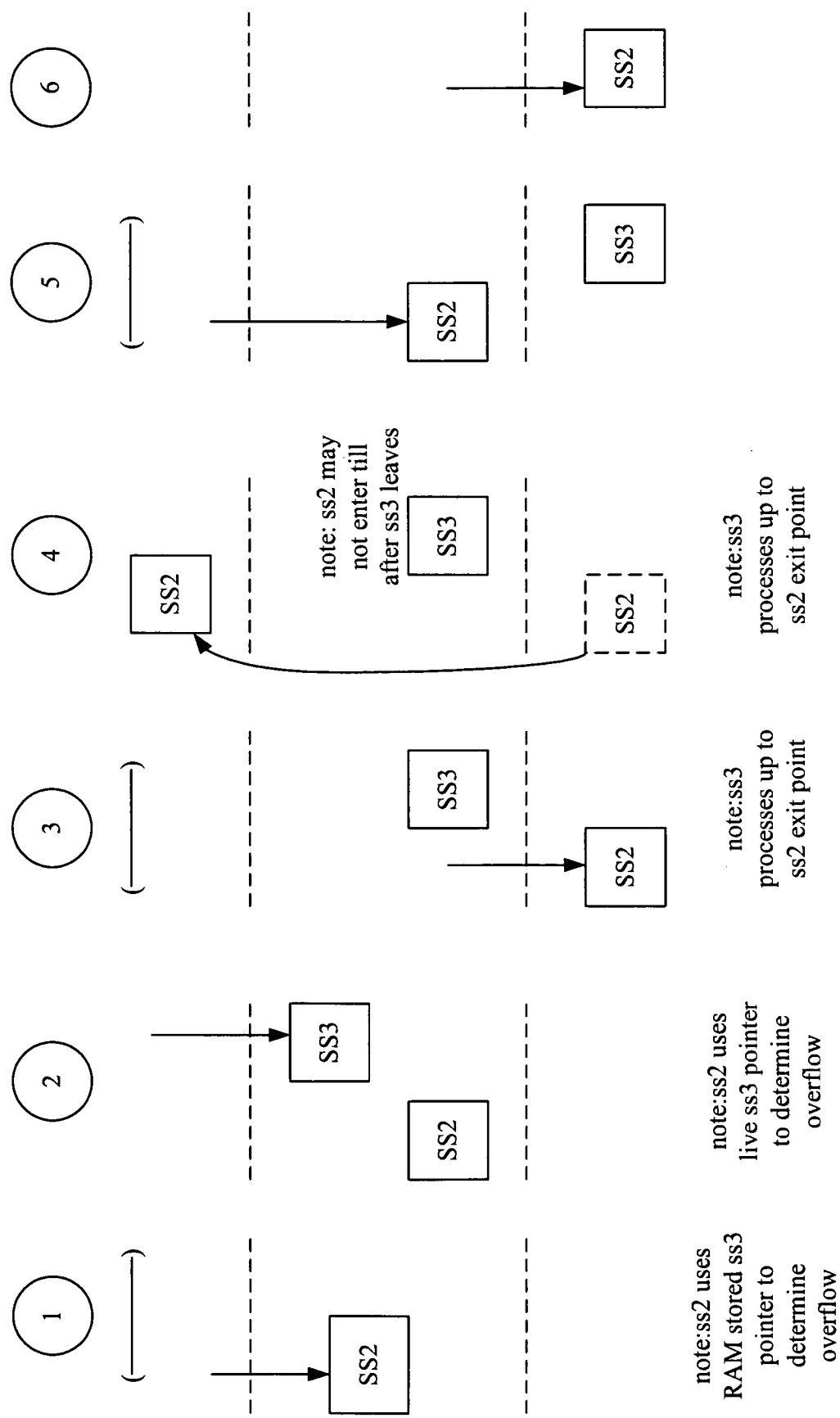
FIG. 19 is a diagram illustrating lapping rules in the interaction of SS2 and SS3 in an embodiment.

FIG. 19 is a diagram that illustrates lapping rules in the interaction of SS2 and SS3. The circled numbers at the top of the figure indicate a sequence of time periods. Between each set of horizontal dashed lines is a channel in the particular time period.

Referring to time period 1, SS2 enters the channel, which means that the signal processing subsystem is in possession of the channel and is being used to process data for the channel. SS2 uses an SS3 pointer stored in the coherent RAM area to determine whether there is an overflow condition.

According to the lapping rules, if SS3 were in the channel first, SS2 could not enter until SS3 exited the channel. When SS3 is in the channel, and SS2 is not in the channel, SS3 processes all of the data in the coherent RAM for that channel (stored by SS2 from the last time SS2 was processing that channel's data), and exits when all of that channel's data is processed.

As shown in time period 2, when SS2 is in the channel, SS3 may enter the channel when SS3 (the FFT subsystem) has coherent data to operate on for that channel. According to the lapping rules, SS3 may not leave the channel until after SS2 has left the channel. Both SS2 and SS3 are in the channel, so SS2 uses a live SS3 pointer to determine whether there is an overflow condition.

As previously stated, the SS2 channel RAM base pointers are read by the sequencer, loaded into a register, and compared to the corresponding SS3 pointer to prevent lapping. If SS2 is in a channel and SS3 is in the same channel, then the sequencer on the SS3 sides knows SS3 cannot leave (because SS2 is in the same channel). The coherent RAM base pointer, on the other hand, enforces the first-in-first-out nature of the data processing. SS3 is concerned with whether SS2 produced enough data to for SS3 to consume, rather than whether SS3 can enter or leave the channel. SS2 is concerned with whether SS3 consumed enough data such that SS2 will not overwrite unconsumed data (which is prevention and/or detection of overflow and underflow conditions).

Referring again to FIG. 19, in time period 3, SS2 finishes processing data for the channel and exits the channel. SS3 processes data for the channel up to the point at which SS2 exits the channel. In time period 4, SS2 is ready to enter the channel again, but may not do so until SS3 exits.

In time period 5, SS3 has exited, and SS2 enters the channel again. In time period 6, SS2 has finished processing and leaves the channel. If SS3 has no more data from the channel to process, it does not need to enter the channel. FIG. 19 thus illustrates how data from more than one particular channel is processed by the subsystems in an interwoven or time-multiplexed manner.

The lapping rules, enforced by the sequencer, provide one part of the overall control of the signal processing component. The other part of the control is provided by the FIFO2, (as shown, for example, in FIG. 3). In one embodiment, the FIFO2 is a circular buffer into which SS2 stores data that is read by SS3. SS2 fills the FIFO2 on a T1-by-T2 basis. SS3 requires a complete PDI (which is a programmed number of T1s) to be available before it will begin reading out and processing data. The number of T1s in a PDI is determined by what the FFT element (not shown) of the FFT subsystem requires. The FFT is configurable to operate on different numbers of T1s. As an example, if the FFT is configured as a 5-sample, 16 point FFT, it needs 5 samples or complete 5 T1s before it can begin reading data out. The combination of the FIFO2 and the lapping rules control the flow between the signal processing subsystem and the FFT subsystem.

The signal processing subsystem (SS2) drives the amount of data that is produced. SS2 is programmed to produce a certain amount of data on each context, where context implies that a channel has entered SS2, and its context will end when it leaves SS2. So in a particular context, SS2 is programmed to run for a number of milliseconds and will read data from FIFO1 until it has consumed the milliseconds it was programmed to process.

The sequencer lapping rules as illustrated in FIG. 19 may be stated as follows:

1. SS2 processed channels may not lap each other;
2. SS2 may not enter a channel (make active) if SS3 is currently active with that channel (else, SS2 has "lapped" SS3 condition);
3. SS3 may not exit a channel if SS2 is currently active with that channel (for example, SS3 processing may be required to follow an SS2 condition; SS3 will process data as it becomes available if SS2 is active);
4. SS2 will process the number of milliseconds it has been programmed to process (including SW correction portion), and will remain in the channel until SS2 processing is complete;
5. SS3 will process as many T1's as are available in its buffer (coherent RAM area). SS3 will process up to the stored SS2 buffer pointers if SS2 is not active, and up to the point where SS2 completes if SS2 is active;
6. SS2 and SS3 may be prevented from continuing processing by a wait semaphore or a wait flag. For example, SS2 may be stalled by "SS3 context done" or by "SS3 PDI done", and SS3 may be stalled by a SS3 PDI done.

In applying the lapping rules, channel RAM pointers are used to determine whether channels are equal. Coherent RAM pointers and "active" flags are used to determine if SS2 and SS3 are in same coherent RAM area. Using a shared coherent RAM area may mean two different channels are active in the same coherent RAM area, and shared coherent RAM areas are treated as if only one channel is trying to access it.

Figure 20:
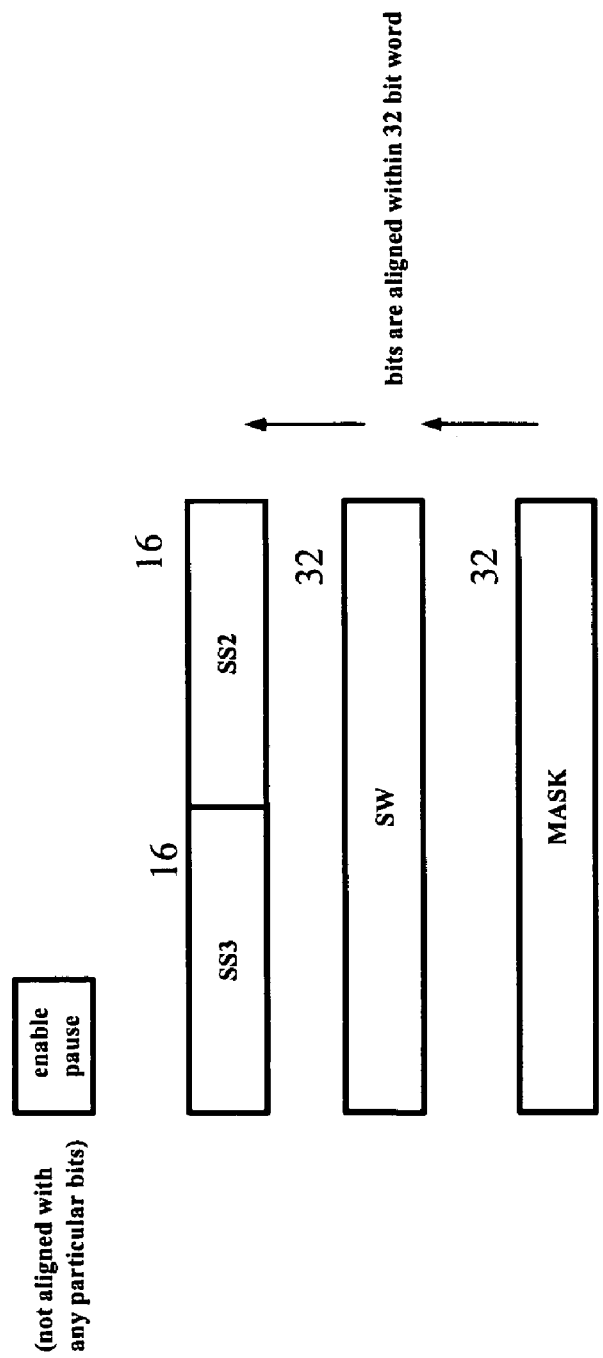
FIG. 20 is a diagram of the semaphore word structure of one embodiment.

The semaphore word and interrupts, and their roles in controlling the operation of the signal processing component, will now be discussed in greater detail. FIG. 20 is a diagram of the semaphore word structure of one embodiment. The semaphore word structure includes 16 bits controlled by the signal processing subsystem (SS2) and 16 bits controlled by the FFT subsystem (SS3). The semaphore word structure further includes 32 bits controlled by software (SW), such as SW 319 of FIG. 3. The 32 bits controlled by SW are aligned with the bits controlled by SS2 and SS3 as explained further below. The semaphore word structure further includes 32 mask bits aligned with both the 32 bits controlled by SW and the bits controlled by SS2 and SS3. The semaphore word structure further includes enable/pause bits that are not aligned with bits in other words.

Figure 21:
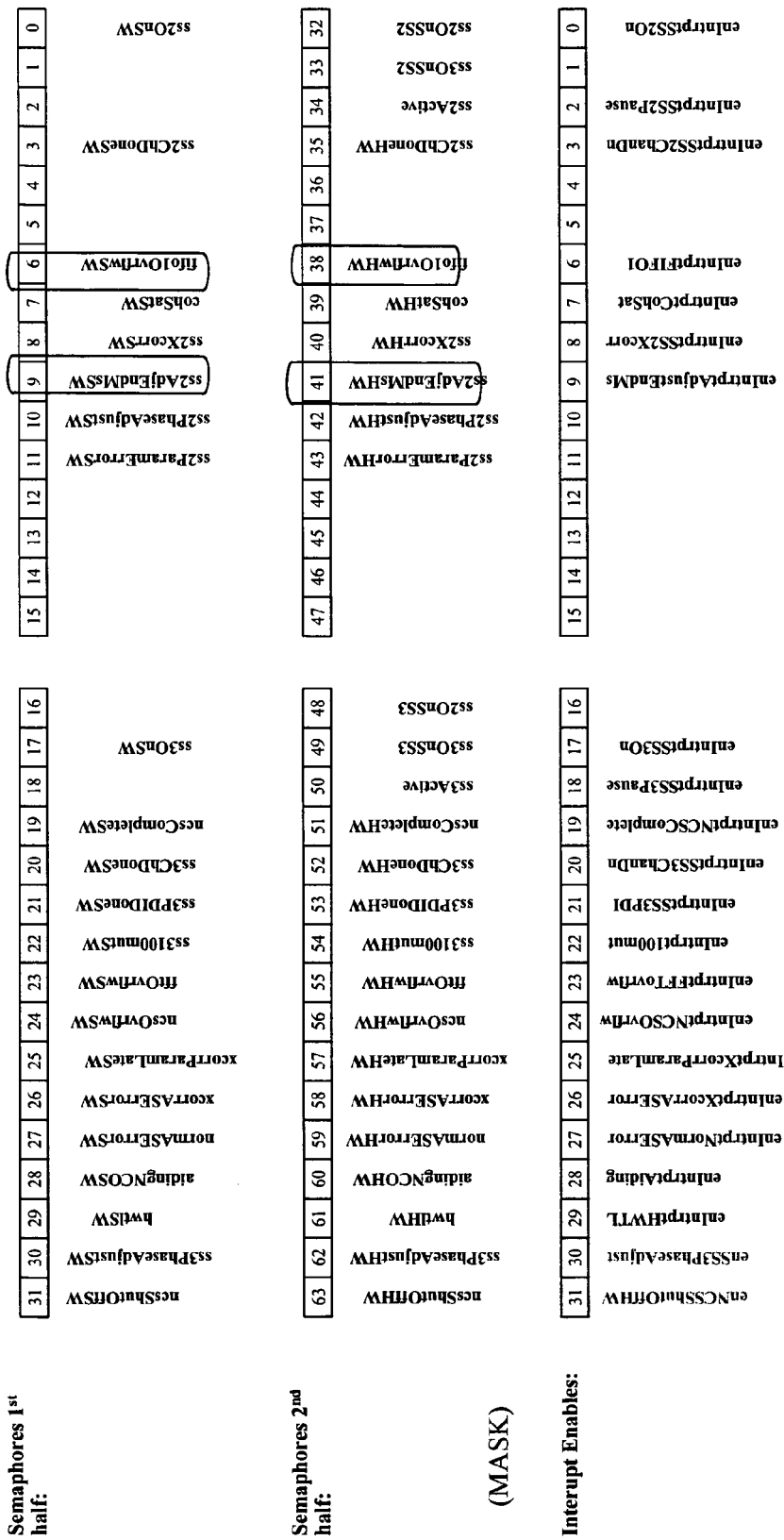
FIG. 21 shows a configuration of semaphore words in an embodiment.

As stated, the semaphore word facilitates communication between SS2, SS3 and SW, which are not synchronous with respect to each other, by enabling the handing back and forth of flags. When a sequencer (e.g., the SS2 sequencer) is initialized, it reads the semaphore word for any SS3 or SW flags. The semaphore word provides information that determines what actions should be taken or not taken by the sequencer. FIG. 21 shows a configuration of semaphore words in an embodiment. The significance of individual bits is indicated by bit labels. The 32 bits labeled "Semaphores $1^{st}$ half" and Semaphores 2nd half" correspond to the 64 bits made up of the SS2 bits, the SS3 bits, and the SW bits in FIG. 20. The 32 interrupt enable bits correspond to the "MASK" bits in FIG. 20. There is a semaphore word as shown in FIG. 21 for each channel.

As shown, for the most part, the semaphore bits overlap. That is, a SS2 bit with a particular significance has a counterpart SS3 bit and a counterpart SW bit. Messaging between SS2, SS3 and SW includes performing an XOR of hardware (HW) bits and SW bits with corresponding significances. HW includes the signal processing subsystem (SS2) and the FFT subsystem (SS3). Messaging is in two directions: in one direction HW lets SW know that a HW event occurred. In the other direction to command SW commands HW to perform an action. The bits function as semaphore "flags". Using a status semaphore as an example, when HW wants to notify SW of an event, HW changes the existing state of the appropriate bit. The initial starting states of two corresponding bits are the same; either zero or one. When the state of the bit is changed by HW, the XOR of the two bits is a one. When SW then looks at the semaphore word, it knows that HW set the flag because the XOR result is one. SW responds by changing the state of the corresponding bit under its control. Of course, this makes the states of the two bits the same again, thus making the XOR result for the two bits zero, and clearing the flag. The SW response to the HW flag information can be interpreted as an acknowledgment, a command, a reset or initialization, depending on the significance of the flag.

In the other direction, SW creates a command by making the XOR result zero for some bit pair of a particular significance. An example is the command to create a 100MUT report. When HW receives the command, it acknowledges by changing the bit under its control to make the XOR result a one again.

To use one set of bits as an example of a command and acknowledgment with reference to FIG. 20, the Semaphores $1^{st}$ half word includes an ss2AdjEndMsSW bit (circled), which is software controlled. The Semaphores 2nd half word includes the HW controlled counterpart, ss2AdjEndMsHW (also circled). The ss2AdjEndMsSW bit tells the HW "instead of processing the normal number of milliseconds, process additional ms". In this particular case, SW creates the command to HW by changing the state of the bit under its control and making the XOR of the two corresponding bits a zero. After HW completes the command, it sends an acknowledgment by changing the state of its ss2AdjEndMsHW bit to make the XOR a one again.

As an example of a status flag, the Semaphores $1^{st}$ half word includes fifo1OvrflwSW (circled). The Semaphores 2nd half word includes the HW controlled counterpart, fifo1OvrflwHW (also circled). When a FIFO1 overflow condition occurs, meaning SS1 overwrote a portion of data before SS2 had a chance read it out, that is communicated with the semaphore word by changing state of the bit under HW control, and if applicable, generating a corresponding interrupt.

The third row of bits in FIG. 21 includes interrupt enable mask bits for interrupts for a particular channel. Interrupts are related to the semaphore word. When HW has an event for which it wants to set a status semaphore bit, it can also generate an interrupt. The interrupts are lines that come out of SS2. The lines do not indicate which channel was in the subsystem when the interrupt was created. SW determines which channel created the interrupt by reading the semaphore words of all of the channels to find the set bit. Interrupts are discussed in more detail below.

There are some particular bits that do not operate according to the XOR messaging just described. Instead, these bits operate as an AND of three bits. There are three such bits for SS2 and three such bits for SS3. The bits are referred to as "ON" bits and they indicate is whether the channel is to be processed or not. For example, SS3 has three "ON" bits, one of which is controlled by SS2, one of which is controlled by SS3 and one of which is controlled by SW. Any one of those sources could cause the "ON" bits to have an "OFF" connotation, or "turn the "ON" bits off" by changing the state of the bit under its control. When a subsystem initializes, it first determines from the semaphore word whether it should pause. The subsystem then determines from the "ON" bits whether it may begin processing or not. If the "ON" bits are turned off, the subsystem exits loads the pointer for the next channel.

One condition that turns the "ON" bits off is a termination condition. For example, if SS3 has processed the number of PDIs to be processed, SS3 turns off its own "ON" bit and the "ON" bit of SS2 that it has control of. Then when SS2 comes to that channel, it will "skip".

FIG. 22 is a list of the SS2, SS3, and FIFO1 semaphores, including HW controlled semaphores and SW controlled semaphores.

A pause bit, or pause flag, exists in each of SS2 and SS3. The pause flags are shared by all channels using the hardware resources. The pause flags can be set under a number of circumstances, including errors. When the pause flags are set by completion of a channel, or by completion of a PDI, SS2 will process up to the pause and stall.

In reaction to a pause, SW performs any processing required and updates the appropriate parameters. SW updates the SW portion of the channel semaphore word to clear the done semaphore. If a pause of SS2 is enabled, SW clears the HW pause register. SW reads the channel base pointer in facilitating a pause.

Interrupts are created when the semaphore word is updated and stored back in the channel buffer. In one embodiment, interrupts are enabled upon an acknowledgment of the semaphore write by the arbitration unit. A channel done semaphore and a PDI semaphore are toggled each time a channel completes or a PDI completes, respectively. Channel done semaphores are written back when the channel active bit in the semaphore word is cleared.

FIG. 23 lists all of the interrupts in one embodiment. Various interrupts are under the control of different elements, as shown. The timer interrupts are controlled by SS1. These are more related to timing than to sequencing. Specifically, the timer interrupts are related to the timing of input data written into FIFO1.

As previously mentioned, an overflow condition includes one subsystem beginning to overwrite data that another subsystem has not had an opportunity to process yet. Overflow is an error condition that causes an interrupt. One of the interrupts under the control of SS2 is "FIFO1 overflow". When FIFO1 overflow occurs upon the initiation of SS2, the interrupt has the effect of shutting down the channel. The channel updates the semaphore word and sets the interrupt flag (if enabled) upon exiting.

When FIFO1 overflow occurs during SS2 processing, the channel sets a local overflow flag and continues processing, the resultant data is recognized as "garbage data". When the channel is finished processing, it updates the semaphore word and sets the interrupt flag (if enabled) upon exiting. The channel clears the local overflow flag Interrupts are also generated when a subsystem finishes processing data for a channel. For example, when SS2 finishes processing data for a channel, the channel updates the semaphore word and sets the SS2 channel done interrupt upon exiting. When SS3 finishes processing data for a channel, the channel updates the semaphore word and sets the SS3 channel done interrupt upon exiting.

When SS3 is finished processing a PDI-worth of data, and the channel is completed also, S33 sets both the SS3 channel done and PDI done interrupts (if enabled), upon exiting channel. If SS3 is finished processing a PDI, but the channel is not completed, only the PDI done interrupt is set, and the semaphore word is written back to channel buffer, and SS3 stalls (if enabled)

Another part of the sequencer functionality is determining termination conditions. For example, the sequencer determines whether SS2 and SS3 combined have completed the required amount of processing. FIG. 24 is a list of termination conditions for SS2 and SS3. A termination condition from the perspective of SS2 is a FIFO1 overflow. This occurs when SS1 has overwritten data not yet processed by SS2. In this case, SS2 shuts off its own "ON" bit and also the "ON" bit of SS3 that it controls; it also sends out an interrupt to let SW know what has happened. From then on, every time the sequencing reaches the channel for which overflow occurred, it will skip. This gives SW time to go in and reprogram the channel RAM before it reprograms the "ON" bits.

From the perspective of SS3, termination condition occurs when SS3 has reached the PDI count, when there is an overflow in the processing path, or when an "early termination event" occurs. When SS3 has reached the PDI count, it is finished processing the data available to it. Recall that SS3 processes data on a PDI basis as it is available. SS3 can be programmed to operate for a particular number of PDIs. When the data in the applicable number of PDIs has been processed and non-coherently accumulated by SS3, SS3 sets a bit in the semaphore word to indicate a termination condition.

An early termination can be caused by certain parameters being exceeded. For example, there are autoscale values associated with coherent RAM and also with non-coherent accumulation (an autoscale value is an exponent associated with a non-coherent summation). If that value exceeds a range, or if it grows very rapidly, it indicated a strong signal and it is not necessary to count all 100 PDIs.

SW may also command a termination in order to cleanly shut down a channel. Generating a termination condition is a clean way for SW to shut down a channel in part because this takes the sharing of RAM between channels into account. It would be undesirable to shut down a channel before it has pulled out its data from FIFO2. It doesn't really need to process the data from FIFO2; what is important is that it advances its pointer beyond the region, because the next channel will look at this shared pointer. This allows SW to tell SS3 to shut down, but only after it has advanced its pointer beyond where it was supposed to process. SS3 is supposed to process whatever data SS2 put in the buffer for SS3, and this data must be pulled out by SS3 before it exits the context.

Termination and early termination take into consideration the even and odd half frequencies. For example, SS2 processing for 10 milliseconds may mean 10 milliseconds of odd half chips, then 10 milliseconds of even half chips, and then 10 milliseconds each for multiple frequencies steps. So SS3 must pull out of memory whatever data SS2 put in. SS3 knows whether the data is odd or even and how much data there is. Accordingly, SS3 pulls out all of the data it should be expecting and then terminates. The specific characteristics of termination conditions are thus somewhat dependent on the type of processing that is occurring at the time.

The foregoing described the sequencing of operations in a signal processing component such as signal processing component 101, and descriptions of semaphore word messaging between component elements interrupts, and termination conditions. The following is a description of embodiments of sequencer elements and their functions.

Figure 25:
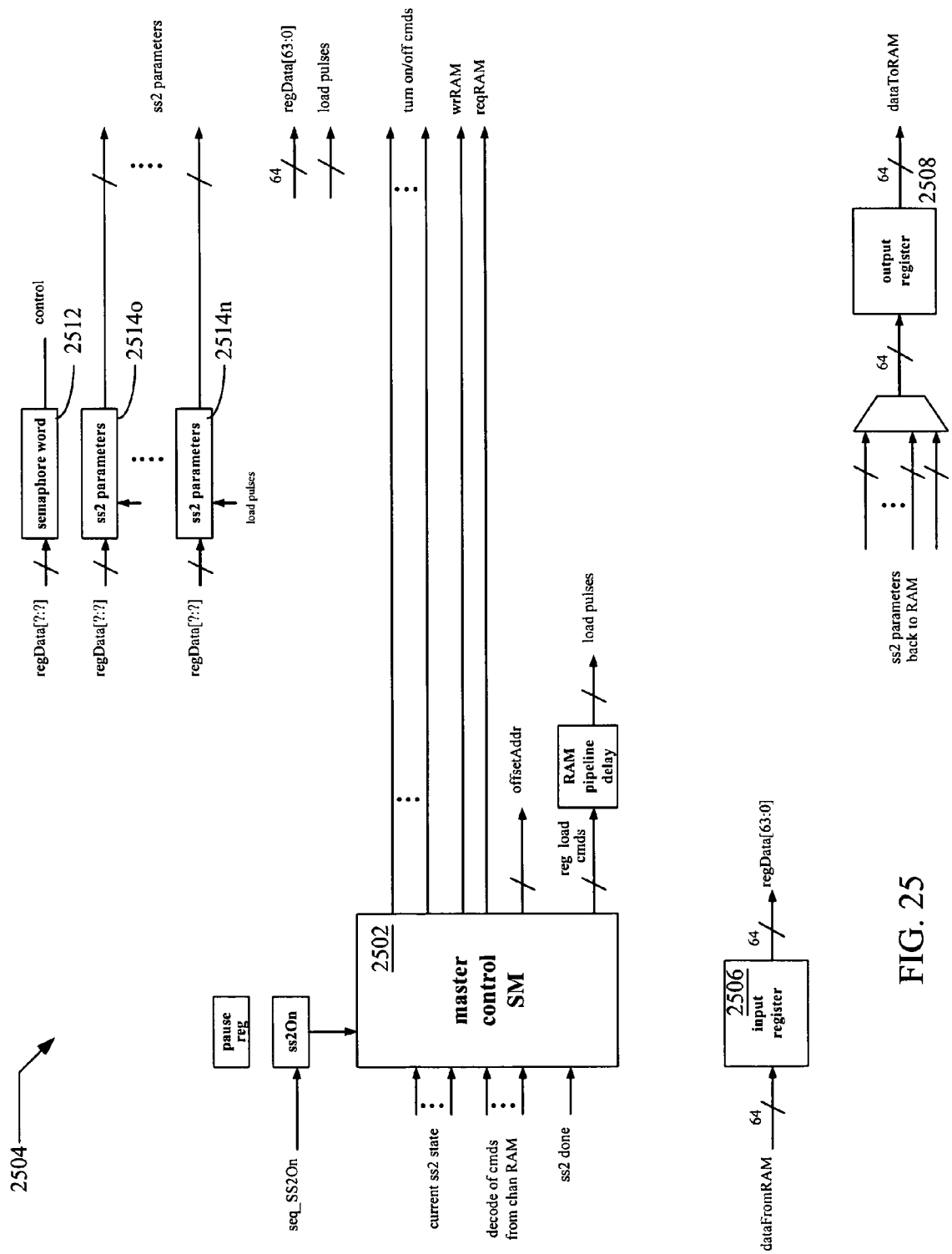
FIG. 25 is a block diagram of an embodiment of a sequencer.

FIG. 25 is a block diagram of an embodiment of a signal processing subsystem sequencer 2504. The sequencer 2504 shows more detail of a sequencer such as the sequencer 313a of FIG. 3. The signal processing subsystem sequencer 2504 includes an input register 2506, or input port, through which it reads data from the channel RAM. The signal processing subsystem sequencer 2504 also writes data back into the channel RAM through an output register 2508, or output port. A master control element 2502 in one embodiment is a state machine. Data is addressed relative to certain address bases. For example, there is a channel base address for the channel RAM, and there are base addresses for the various other allocated RAM areas (coherent RAM, NCS RAM, and so on). The base address indicates the channel record being processed, and access to the channel record is relative to the base address. The input port 2506 pulls in assorted parameters and stores them as needed in the master control element 2502. At the end of processing the sequencer 2504 writes the updated parameters back to the channel RAM through the output port 2508.

At the top of the diagram is shown data that is used to control the signal processing subsystem. As previously stated, for example with reference to FIG. 17, the channel RAM contains parameters $2514_0$ through $2514_n$ that are required to configure the subsystem for operation in a particular mode. A semaphore word is also used to control the signal processing subsystem. The semaphore word includes command and status information. The semaphore word is used to communicate between the signal processing subsystem, the FFT subsystem, and software, and can be stored in any memory area accessible by all of the elements requiring access to it. In one embodiment, semaphore words are stored in the channel RAM.

Figure 26:
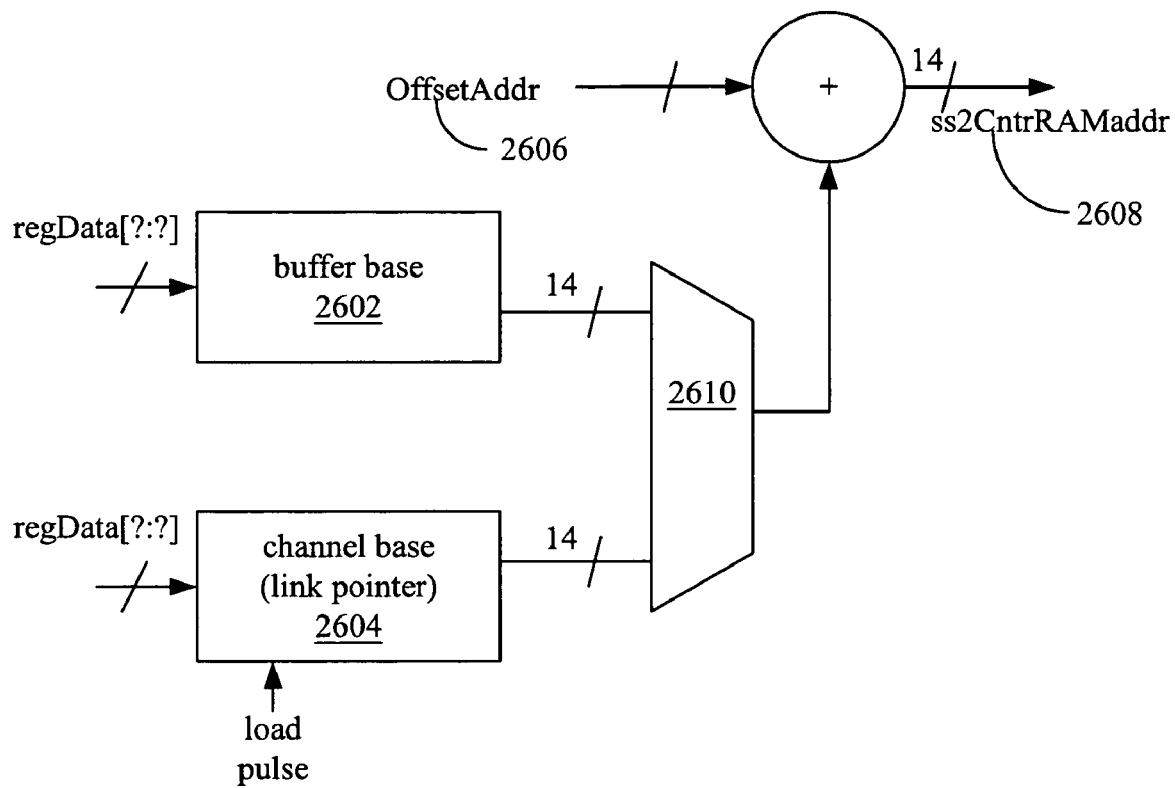
FIG. 26 is a block diagram of elements that generate a RAM address according to an embodiment.

The generation of the RAM address according to an embodiment is illustrated in FIG. 26, which shows one of a buffer, or RAM area, base address 2602, and a channel base address 2604 being combined with an offset address 2606 to yield an actual RAM address 2608 (ss2CntrlRAMAddr) for signal processing subsystem access. The selection of the buffer base address 2606 or the channel base address 2608 is made by a select signal from the master control element 2502 to the multiplexer 2610.

Figure 27:
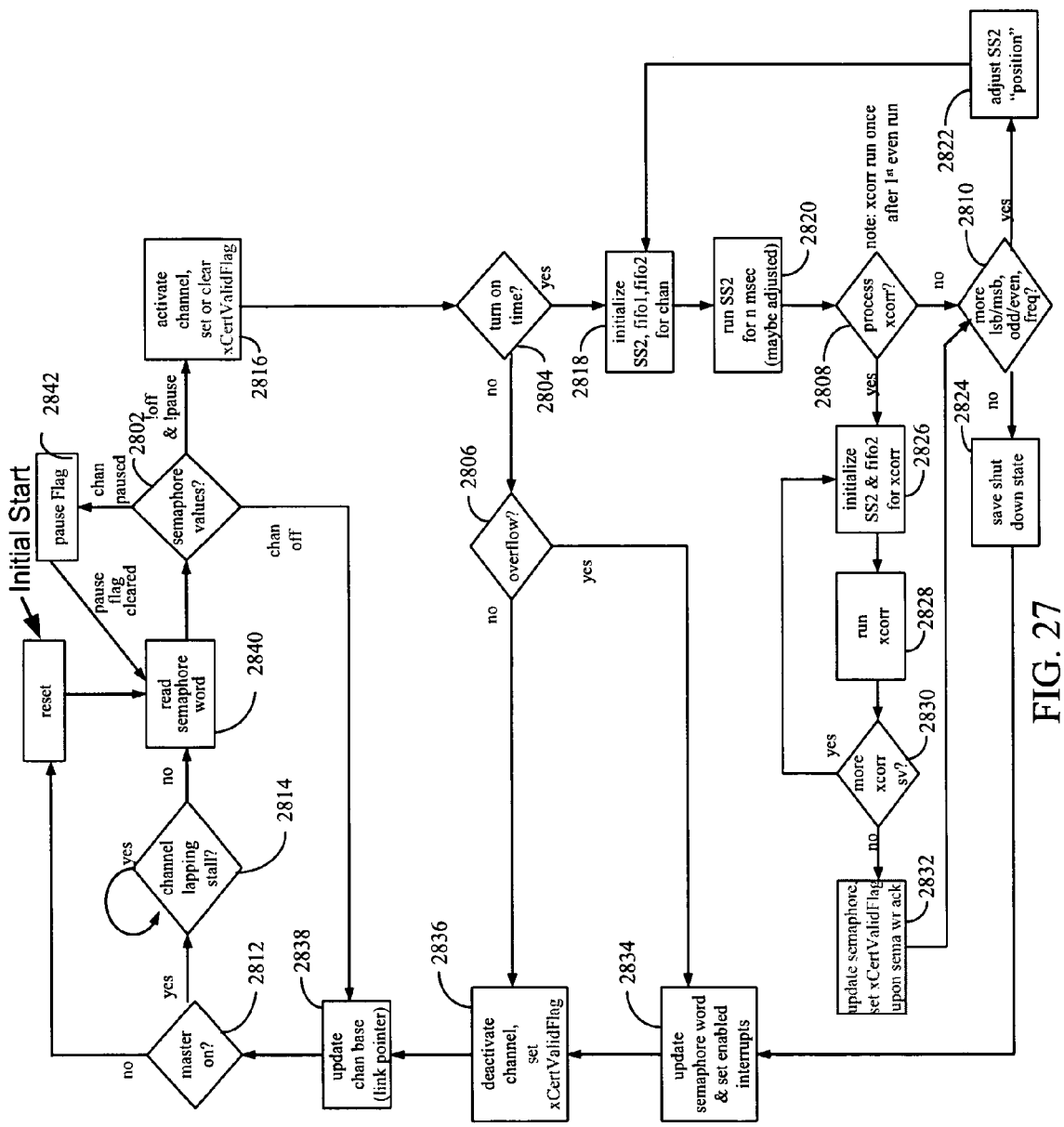
FIG. 27 is a flow diagram illustrating the operation of a signal processing subsystem sequencer of one embodiment.

FIG. 27 is a flow diagram illustrating the operation of a signal processing subsystem sequencer such as sequencer 313a of FIG. 3. At the point labeled "initial start", SS2 is reset. The semaphore word is read by software ("SW") at 2840. As shown in a decision block 2802, if the channel is paused, the pause flag 2804 is cleared, and processing returns to reading the semaphore word at 2840. If the semaphore word indicates that the channel is off, the channel base pointer, or link pointer, is updated at 2838. It is then determined whether the master control element is on at 2812. If the master control element is not on, the process returns to the initial start point, or reset.

If the master controller is on, it is determined at 2814 whether the channel is stalled because of lapping. If so, the sequencer remains in that state, checking the lapping condition, until the lapping condition no longer exists. When the lapping condition is cleared, the sequencer returns to reading the semaphore word at 2840.

Referring again to decision block 2802, if the channel is not off and not paused, the channel is activated at 2816, and the appropriate flags are set or cleared in the semaphore word. Several parameters are initialized at the beginning of an SS2 "run". They include the following parameters:

number of milliseconds to process;
carrier acceleration;
carrier frequency;
carrier phase;
code phase;
millisecond count within a T1;
T1 count within an address space and within a wrap;
address of base of current T1;
address of base of current coherent buffer;
autoscale and saturate flag; and
line block and wrap of FIFO1.

SW then looks at turn on time at 2804 to determine whether there is sufficient data in the input FIFO (FIFO1) for the channel to process. If there is not, SW determines whether there is an overflow at 2806. If there is no overflow, the channel is deactivated and the appropriate flag(s) set at 2836. Processing then moves to 2838 as previously described.

If there is an overflow, the semaphore word is updated and appropriate interrupts are enabled at 2834. Processing then moves to 2836 as previously described.

If it determined at 2804 that there sufficient data in the input FIFO (FIFO1) for the channel to process, then SS2 is initialized at 2818, including pulling data in from the channel RAM and other memory regions. FIFO1 and FIFO 2 are also initialized for the channel. SS2 is run for an adjustable number of milliseconds at 2820. If cross-correlation processing is programmed to occur, as shown at 2808, it is preformed once after the first run of even half chips. SS2 and FIFO2 are initialized for cross-correlation at 2826, and cross-correlation is performed at 2828. It is determined whether there are more cross-correction satellite vehicles (SVs) to be processed at 2830. It there are no more SVs, the semaphore word is updated and the appropriate flags are set upon acknowledgment of the semaphore word write at 2832. Then, processing returns to decision block 2810, as described below.

If cross-correlation processing is not programmed to occur, it is determined at 2810 whether there are more frequencies to process. If there are, SS2's "position" is adjusted with respect to the incoming data at 2822, and SS2, FIFO1, and FIFO2 are again initialized for the channel at 2818.

If there are no more frequencies to process, that is, as many even and odd half chips and frequency states as desired have been processed, the shut down state is saved at 2824, and the sequencer goes to memory to update the semaphore word and set the enabled interrupts at 2834. Processing continues with channel deactivation at 2836, as previously described.

Figure 28:
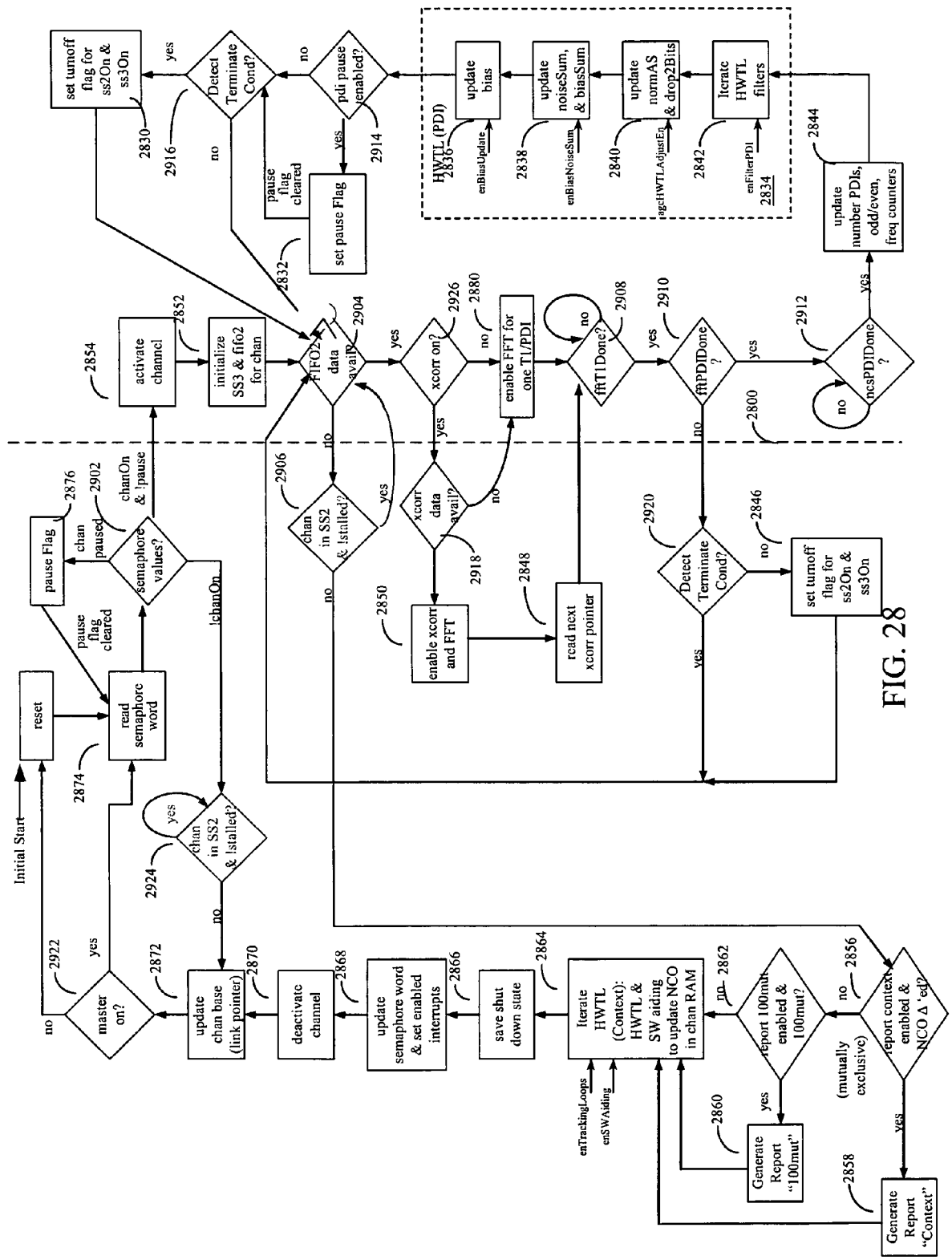
FIG. 28 is a flow diagram illustrating the operation of an FFT subsystem sequencer of one embodiment.

FIG. 28 is a flow diagram illustrating the operation of an FFT subsystem sequencer, such as the sequencer 315a of FIG. 3. Generally speaking, data processing on a PDI basis is represented by operations/functions to the right of the dashed line 2800. At the point labeled "initial start", SS3 is reset.

The semaphore word is read by SW at 2874. As shown in a decision block 2902, if the channel is paused, the pause flag 2876 is cleared and the semaphore word is read at 2874 again. If pause is enabled, SW is indicating that it wants the subsystem to stop so that SW can come in and make changes to programming, or collect data. This can occur, for example, on a PDI basis or upon entry of a channel into the subsystem.

If the channel is not paused, but the channel is not on, it is determined at 2924 whether the channel in SS2 (the signal processing subsystem) is stalled. If the channel in SS2 is not stalled, the channel base pointer, or link pointer, is updated at 2872. It is then determined at 2922 whether the master control element is on. If the master control element is not on, the process returns to initialization (reset). If the master control element is on, the semaphore word is read at 2874 as previously described.

Referring again to the decision block 2902, if the channel is not off and not paused, the channel is activated at 2854. SS3 and FIFO2 are initialized for the channel at 2852. At decision block 2904, it is determined whether there is any FIFO2 data available. This determination is part of lapping rule implementation, as previously discussed. If there is FIFO2 data available, it is determined at decision block 2926 whether cross-correlation is to be performed. If cross-correlation is to be performed, it is determined at 2918 whether there is cross-correlation data available. If cross-correlation data is available, cross-correlation and FFT processing are enabled at 2850. The next cross-correlation pointer is then read at 2848 and processing moves to decision block 2908 as further described below.

If cross-correlation is not to be performed, then FFT processing is enabled at 2880. FFT processing continues until a T1 is finished, as shown at 2908. When FFT processing for the T1 is finished, it is determined whether FFT processing for the PDI is finished, as shown at 2910. When FFT processing for the PDI is finished, it is determined whether NCS processing for the PDI is finished, as shown at 2912. When FFT processing and NCS processing for the PDI are finished, the number of PDIs, the number of odd and even half chips, and the frequency counters are updated at 2844. A hardware tracking loop (HWTL) indicated by 2834 updates multiple parameters. The HWTL filters are iterated at 2842. A norm value, a noisesum value, and a bias value are updated as shown in 2840, 2838, and 2836, respectively.

After the HTWL 2834, it is determined, at 2914, whether a PDI pause is enabled. If it is not, it is determined at 2916 whether there is a termination condition. If there is a termination condition, turnoff flags for SS2 and SS3 are set at 2830. Then processing returns to 2904. If there is no termination condition, processing returns to 2904.

If the PDI pause is enabled, the pause flag 2832 is cleared, and termination is detected at 2916.

Returning to 2910, if FFT processing of the PDI is not done, a termination condition is checked for at 2920. If there is a termination condition, processing returns to 2904. If there is no termination condition, the turnoff flags for SS2 and SS3 are set at 2846, and processing then returns to 2904.

Referring again to 2904, if FIFO2 data is not available, it is determined at 2906 whether the channel in SS2 is stalled. If the channel in SS2 is stalled, processing returns to 2904 to check for FIFO2 data again. If the channel in SS2 is not stalled, it is determined whether the report context is enabled and the NCO changed at 2856. If report context is not enable and the NCO has not changed, it is determined whether a 100mut (100 millisecond) report is enabled and whether there is 100mut of data to report at 2862. If so, a 100mut report is generated at 2860 and processing moves to 2864. 2864 includes iterating the HWTL context, and HWTL and SW aiding to update the NCO in the channel RAM. The events of 2864 also occur in response to a determination at 2862 that the 100mut report is not enabled and there is not 100mut of data to report.

Referring again to 2856, if it is determined that the report context is enabled and the NCO changed, a context report is generated at 2858, and processing progresses to 2864. After 2864, the shut down state is saved at 2866. The semaphore word is updated and appropriate interrupts are enabled at 2868. The channel is then deactivated at 2870. The channel base pointer, or link pointer is updated at 2872 and processing continues as previously described.

Aspects of the memory allocation and sharing of any of the described embodiments may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the memory allocation and sharing of an embodiment include: microcontrollers with memory (such as electronically erasable programmable read only memory (EEPROM)), embedded microprocessors, firmware, software, etc. Furthermore, aspects of the memory allocation and sharing of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used herein, shall refer to this patent as a whole and not to any particular portions of this patent. When the word "or" is used in reference to a list of two or more items, that word covers all of the following interpretations of the word: any of the items in the list, all of the items in the list and any combination of the items in the list.

The above description of illustrated embodiments of the memory sharing is not intended to be exhaustive or to limit the invention to the precise form disclosed. While specific embodiments of, and examples for, the memory sharing are described herein for illustrative purposes, various equivalent modifications are possible within the scope of the invention, as those skilled in the relevant art will recognize. The teachings of the memory allocation and sharing provided herein can be applied to other electronic systems, not only for the electronic systems described above.

The elements and acts of the various embodiments described above can be combined to provide further embodiments. These and other changes can be made to the memory sharing of an embodiment in light of the above detailed description.

Aspects of the embodiments described herein can be modified, if necessary, to employ the systems, functions and concepts of the various patents and applications described above to provide yet further embodiments of the memory allocation and sharing.

In general, in the following claims, the terms used should not be construed to limit the memory allocation and sharing to the specific embodiments disclosed in the specification and the claims, but should be construed to include all electronic systems that operate under the claims to provide memory allocation and sharing. Accordingly, the memory allocation and sharing is not limited by the disclosure, but instead the scope of the memory sharing is to be determined entirely by the claims.

While certain aspects of the memory allocation and sharing are presented below in certain claim forms, the inventors contemplate the various aspects of the memory allocation and sharing in any number of claim forms. For example, while only one aspect of the memory allocation and sharing is recited as embodied in computer-readable medium, other aspects may likewise be embodied in computer-readable medium. Accordingly, the inventors reserve the right to add additional claims after filing the application to pursue such additional claim forms for other aspects of the memory allocation and sharing.

What we claim is:

1. A signal processing method in a signal processing system including a plurality of subsystems, the method comprising:
   storing channel records in a designated area of shared memory, wherein a channel comprises channel data including one of a plurality of discrete signals to be processed by the signal processing system, wherein multiple channels are processed by the plurality of subsystems in a time-multiplexed manner, and wherein a channel record comprises information used by the plurality of subsystems to process a channel;
   reading a channel record in conjunction with each channel processed;
   configuring the plurality of subsystems according to the read channel records;
   allocating a shared memory according to the read channel records; and
   updating the read channel records as the multiple channels are processed.

2. The method of claim 1, further comprising:
   receiving channel data and generating intermediate data in a first subsystem of the signal processing system;
   processing the intermediate data in a second subsystem of the signal processing system; and
   storing the intermediate data in an area of the shared memory.

3. The method of claim 2, further comprising preventing an underflow condition, wherein the underflow condition comprises the second subsystem reading intermediate data from the area of the shared memory before a predetermined amount of data has been written by the first subsystem.

4. The method of claim 3, further comprising preventing an overflow condition, wherein the overflow condition comprises the first subsystem overwriting intermediate data in the area of the shared memory before the intermediate data has been read out by the second subsystem.

5. The method of claim 4, wherein the channel records are initially stored by an off-board processor and updated by the off-board processor as signal processing occurs, and wherein the channel records comprise a plurality of words including at least one semaphore word used to communicate among the off-board processor, the first subsystem, and the second subsystem.

6. The method of claim 5, further comprising:
   storing a plurality of bits in a first semaphore word, including bits that refer to and are controlled by the first subsystem, and bits that refer to and are controlled by the second subsystem; and
   storing a plurality of bits in a second semaphore word, including bits that correspond to each bit in the first semaphore word and that are controlled by the off-board processor.

7. The method of claim 6, wherein communicating among the off-board processor, the first subsystem, and the second subsystem comprises:
   the first subsystem and the second subsystem changing a state of one of the plurality of bits in the first semaphore word under control of the respective subsystem, wherein the bit indicates designated information regarding the respective subsystem; and
   combining the one bit of the first semaphore word with a corresponding bit of the second semaphore word, wherein a result of the combination changes a result bit from an initial state to indicate a change in the designated information.

8. The method of claim 7, further comprising the off-board processor changing a state of the corresponding bit of the second semaphore word to indicate receipt of the change in the designated information, wherein the state of the result bit changes to the initial state.

9. The method of claim 6, further comprising:
   storing a plurality of bits in a mask word, including bits that correspond to each of the bits in the first semaphore word and the second semaphore word; and
   using states of the plurality of the bits in the mask word to signal interrupts.

10. The method of claim 6, further comprising controlling the first subsystem, including:
    at initialization of the system, reading a semaphore word in a first channel record to determine,
       whether a channel to be processed is paused; and
       whether the channel is off; and
    when the channel is off, reading a semaphore word in a second channel record.

11. The method of claim 10, further comprising:
    when the channel is not off and not paused, activating the channel, including indicating status by updating the first semaphore word;
    detecting an overflow condition; and
    in response to detecting an overflow condition, deactivating the channel, including indicating status by updating the first semaphore word.

12. The method of claim 11, further comprising:
    initializing hardware in the first subsystem for processing the channel;
    processing the channel for a predetermined period; and
    updating the first semaphore word to indicate that the channel is finished processing.

13. The method of claim 6, further comprising controlling the second subsystem, including:
    at initialization of the system, reading a semaphore word in a first channel record to determine,
       whether a channel to be processed is paused; and
       whether the channel is off;
    when the channel is on, determining whether the channel is stalled in the first subsystem; and
    if the channel is stalled in the first subsystem, reading a semaphore word in a second channel record.

14. The method of claim 13, further comprising:
   activating the channel, including indicating status by updating the second semaphore word;
   detecting an overflow condition;
   initializing hardware in the second subsystem for processing the channel;
   determining whether intermediate data for the channel is available;
   if intermediate data is not available, determining whether the channel is stalled in the first subsystem; and
   if the channel is not stalled in the first subsystem, determining again whether intermediate data for the channel is available.

15. The method of claim 14, further comprising:
   if intermediate data for the channel is available, processing the intermediate data;
   determining whether a predetermined amount of data is finished processing;
   indicating status by updating the second semaphore word; and
   saving a state of the second subsystem by updating a current channel record.

16. The method of claim 6, further comprising enforcing lapping rules such that the first subsystem and the second subsystem may not lap each other in processing a channel, including:
   preventing the first subsystem from activating a channel if the second subsystem is currently active in the channel; and
   preventing the second subsystem from exiting a channel if the first subsystem is currently active in the channel.

17. The method of claim 16, wherein enforcing the lapping rules further comprises comparing memory pointers for the first subsystem to memory pointers for the second subsystem, and wherein the memory pointers are stored in channel records.

18. A method for signal processing in a satellite-based communication system, the method comprising:
   receiving signals from a plurality of satellite vehicles in a corresponding plurality of channels;
   processing the plurality of channels using multiple subsystems of the communication system, including processing more than one channel concurrently in more than one subsystem; and
   controlling channel processing, including,
      storing channel parameters in a channel record associated with a particular channel, wherein the channel parameters are used to process the particular channel;
      storing memory pointers in the channel record, wherein the memory pointers indicate memory locations of data for particular subsystems processing the particular channel; and
      storing semaphore words in the channel record, wherein the semaphore words are used to communicate between the multiple systems and an off-board processor, including communicating status and communicating commands.

19. The method of claim 18, wherein the subsystems comprise a signal processing subsystem that receives signals from the plurality of satellite vehicles and generates channel data; and
   a fast Fourier Transform (FFT) subsystem that processes the channel data, wherein controlling channel processing further comprises controlling the signal processing subsystem and the FFT subsystem, including preventing an overflow condition in which the signal processing subsystem overwrites channel data that has not yet been processed by the FFT subsystem.

20. The method of claim 19, wherein controlling the signal processing subsystem and the FFT subsystem further includes preventing an underflow condition in which the FFT subsystem reads out channel data before a predetermined amount of channel data has been written by the signal processing subsystem.

21. The method of claim 20, wherein preventing overflow and underflow conditions includes comparing memory pointers associated with the signal processing subsystem and the FFT subsystem, respectively.

22. The method of claim 19, wherein controlling channel processing further comprises preventing the signal processing subsystem and the FFT subsystem from lapping each other in a channel, including:
   preventing the signal processing subsystem from beginning to process a channel if the FFT subsystem is currently active in the channel; and
   preventing the FFT subsystem from terminating processing a channel if the signal processing subsystem is currently active in the channel.

23. The method of claim 19, wherein controlling channel processing further comprises:
   detecting conditions in the signal processing subsystem and the FFT subsystem that require one of the subsystems to stop or pause processing;
   using the semaphore words to communicate the overflow and underflow conditions among the signal processing subsystem and the FFT subsystem; and
   using the semaphore words to generate interrupts, including interrupts that cause the off-board processor to modify channel records.

24. A signal processing system, comprising:
   a signal processing subsystem that receives radio frequency signals from a plurality of satellite vehicles in a plurality of channels and generates coherent data;
   a fast Fourier transform (FFT) subsystem that operates on the coherent data, wherein the signal processing subsystem and the FFT subsystem process multiple channels in a time-multiplexed manner, and wherein the signal processing subsystem and the FFT subsystem operate asynchronously with respect to each other;
   a sequencer that controls the signal processing subsystem and the FFT subsystem; and
   a dynamically allocable memory comprising a plurality of channel records that each contain information pertaining to a channel, wherein the channel records are written by an off-board processor, and wherein the sequencer reads a channel record to control processing of an associated channel.

25. The system of claim 24, wherein the sequencer comprises a signal processing subsystem sequencer configured to:
   read a channel record to determine whether an associated channel is not off and not paused;
   activate the channel when the channel is not off and not paused, including setting and clearing at least one status flag, wherein the status flags comprise bits in a semaphore word;
   process channel data for a predetermined period; and
   deactivate the channel, including setting and clearing the at least one status flag.

26. The system of claim 25, wherein the sequencer comprises an FFT subsystem sequencer configured to:
   read a channel record to determine whether an associated channel is not off and not paused;

activate the channel when the channel is not off and not paused, including enabling FFT processing and noncoherent summation (NCS) processing for a specified amount of coherent data;

determine when the specified amount of coherent data has been processed; and generate at least one report that is stored for the use of the off-board processed, wherein the off-board processor writes the channel record based, in part, upon the at least one report.

27. The system of claim 24, wherein the sequencer is configured to control processing of channels such that underflow does not occur and overflow does not occur, wherein underflow includes the FFT operating on coherent data before a predetermined amount of coherent data has been generated by the signal processing subsystem, and wherein overflow includes the signal processing system overwriting coherent data that has not been operated on by the FFT subsystem.

28. The system of claim 27, further comprising stored memory pointers associated with the signal processing subsystem and the FFT subsystem, respectively, wherein the respective memory pointers are compared to detect an underflow and an overflow.

29. The system of claim 28, further comprising live memory pointers associated with the signal processing subsystem and the FFT subsystem, respectively, wherein at least one of the live memory pointers associated with one of the signal processing subsystem and the FFT subsystem is compared with a memory pointer of the her subsystem to detect an underflow and an overflow.

30. A computer readable medium having stored thereon instructions which, when executed, cause a signal processing system to:

store channel records in a designated area of shared memory, wherein a channel comprises channel data including one of a plurality of discrete signals to be processed by the signal processing system, wherein multiple channels are processed by the plurality of subsystems in a time-multiplexed manner, and wherein a channel record comprises information used by the plurality of subsystems to process a channel;

read a channel record in conjunction with each channel processed;

configure the plurality of subsystems according to the read channel records;

allocate a shared memory according to the read channel records; and update the read channel records as the multiple channels are processed.

31. The computer readable medium of claim 30, wherein the instructions, when executed, further cause the signal processing system to:

process channel data received by the signal processing system in a first subsystem, and generate intermediate data;

process the intermediate data in a second subsystem; and store the intermediate data in an area of the shared memory.

32. The computer readable medium of claim 31, wherein the instructions, when executed, further cause the signal processing system to prevent an underflow condition, wherein an underflow condition comprises the second subsystem reading intermediate data from the area of the shared memory before a predetermined amount of data has been written by the first subsystem.

33. The computer readable medium of claim 32, wherein the instructions, when executed, further cause the signal processing system to prevent an overflow condition, wherein an overflow condition comprises the first subsystem overwriting intermediate data in the area of the shared memory before the intermediate data has been read out by the second subsystem.

34. The computer readable medium of claim 33, wherein the instructions, when executed, further cause the signal processing system to initially store the channel records, and update the channel records as signal processing occurs, and wherein the channel records comprise a plurality of words including at least one semaphore word used to communicate among the instructions, the first subsystem, and the second subsystem.

35. The computer readable medium of claim 34, wherein the instructions, when executed, further cause the signal processing system to:

store a plurality of bits in a first semaphore word, including bits that refer to and are controlled by the first subsystem, and bits that refer to and are controlled by the second subsystem; and store a plurality of bits in a second semaphore word, including bits that correspond to each bit in the first semaphore word and are controlled by an off-board processor.

36. The computer readable medium of claim 35, wherein communicating among the off-board processor, the first subsystem, and the second subsystem comprises:

the first subsystem and the second subsystem changing a state of one of the plurality of bits in the first semaphore word under control of the respective subsystem, wherein the bit indicates designated information regarding the respective subsystem; and combining the one bit of the first semaphore word with a corresponding bit of the second semaphore word, wherein a result of the combination changes a result bit from an initial state to indicate a change in the designated information.

37. The computer readable medium of claim 36, wherein the instructions, when executed, further cause the signal processing system to change a state of the corresponding bit of the second semaphore word to indicate receipt of the change in the designated information, wherein the state of the result bit changes to the initial state.

38. The computer readable medium of claim 35, wherein the instructions, when executed, further cause the signal processing system to:

store a plurality of bits in a mask word, including bits that correspond to each of the bits in the first semaphore word and the second semaphore word; and use states of the plurality of the bits in the mask word to signal interrupts.

39. The computer readable medium of claim 35, wherein the instructions, when executed, further cause the signal processing system to control the first subsystem, including:

at initialization of the system, reading a semaphore word in a first channel record to determine, whether a channel to be processed is paused; and whether the channel is off; and when the channel is off, reading a semaphore word in a second channel record.

40. The computer readable medium of claim 39, wherein controlling the first subsystem further includes:

when the channel is not off and not paused, activating the channel, including indicating status by updating the first semaphore word;

detecting an overflow condition; and in response to detecting an overflow condition, deactivating the channel, including indicating status by updating the first semaphore word.

41. The computer readable medium of claim 40, wherein controlling the first subsystem further includes:
  initializing hardware in the first subsystem for processing the channel;
  processing the channel for a predetermined period; and
  updating the first semaphore word to indicate that the channel is finished processing.

42. The computer readable medium of claim 35, wherein the instructions which, when executed, further cause the signal processing system to control the second subsystem, including:
  at initialization of the system, reading a semaphore word in a first channel record to determine,
    whether a channel to be processed is paused; and
    whether the channel is off;
  when the channel is on, determining whether the channel is stalled in the first subsystem; and
  if the channel is stalled in the first subsystem, reading a semaphore word in a second channel record.

43. The computer readable medium of claim 42, wherein controlling the second subsystem further includes:
  activating the channel, including indicating status by updating the second semaphore word;
  detecting an overflow condition;
  initializing hardware in the second subsystem for processing the channel;
  determining whether intermediate data for the channel is available;
  if intermediate data is not available, determining whether the channel is stalled in the first subsystem; and
  if the channel is not stalled in the first subsystem, determining again whether intermediate data for the channel is available.

44. The computer readable medium of claim 43, wherein controlling the second subsystem further includes:
  if intermediate data for the channel is available, processing the intermediate data;
  determining whether a predetermined amount of data is finished processing;
  indicating status by updating the second semaphore word; and
  saving a state of the second subsystem by updating a current channel record.

45. The computer readable medium of claim 35, wherein the instructions, when executed, further cause the signal processing system to enforce lapping rules such that the first subsystem and the second subsystem may not lap each other in processing a channel, including:
  preventing the first subsystem from activating a channel if the second subsystem is currently active in the channel; and
  preventing the second subsystem from exiting a channel if the first subsystem is currently active in the channel.

46. The computer readable medium of claim 45, wherein enforcing the lapping rules further comprises comparing memory pointers for the first subsystem to memory pointers for the second subsystem, and wherein the memory pointers are stored in channel records.

* * * * *